(12) United States Patent
Okimura et al.

(10) Patent No.: US 9,315,127 B2
(45) Date of Patent: Apr. 19, 2016

(54) DAMPER AND VEHICLE SEAT EQUIPPED WITH THE DAMPER

(71) Applicant: Oiles Corporation, Tokyo (JP)

(72) Inventors: Akihiko Okimura, Kanagawa (JP);
Yoshiteru Igarashi, Kanagawa (JP);
Naohiro Horita, Kanagawa (JP)

(73) Assignee: Oiles Corporation, Tokyo (JP)

( * ) Notice: Subject to any disclaimer, the term of this patent is extended or adjusted under 35 U.S.C. 154(b) by 80 days.

(21) Appl. No.: 14/288,806

(22) Filed: May 28, 2014

(65) Prior Publication Data

US 2014/0300151 A1    Oct. 9, 2014

Related U.S. Application Data

(62) Division of application No. 12/989,748, filed as application No. PCT/JP2009/001806 on Apr. 20, 2009, now Pat. No. 8,869,957.

(30) Foreign Application Priority Data

Apr. 28, 2008  (JP) .................................. 2008-117912

(51) Int. Cl.
*F16F 9/14*    (2006.01)
*B60N 2/427*   (2006.01)
(Continued)

(52) U.S. Cl.
CPC .............. *B60N 2/427* (2013.01); *B60N 2/4228* (2013.01); *B60N 2/42781* (2013.01); *B60N 2/4885* (2013.01); *F16F 9/145* (2013.01)

(58) Field of Classification Search
CPC ............... F16F 9/14; F16F 9/145; F16F 9/16; F16F 9/18; F16F 9/19; F16F 9/3214; F16F 9/34; F16F 9/3405; F16F 9/342

USPC .............. 188/281, 282.1, 290, 293, 294, 306, 188/307, 308, 313, 316, 317, 322.13, 188/322.15
See application file for complete search history.

(56) References Cited

FOREIGN PATENT DOCUMENTS

| JP | 133975/1989 | 7/1991 |
|----|-------------|--------|
| JP | 10-119619   | 5/1998 |
| JP | 10-181403   | 7/1998 |

(Continued)

OTHER PUBLICATIONS

International Search Report for PCT/JP2009/001806, mailed Aug. 4, 2009.

(Continued)

*Primary Examiner* — Robert A Siconolfi
*Assistant Examiner* — Vu Q Nguyen
(74) *Attorney, Agent, or Firm* — Nixon & Vanderhye P.C.

(57) ABSTRACT

A damper includes a vessel for accommodating a viscous fluid in its interior; hampering walls for hampering the flow of the viscous fluid; a partitioning member which partitions each of interior portions into two chambers and is provided rotatably; a communicating hole formed in the partitioning member so as to allow the two chambers to communicate with each other via a variable passage whose passage cross-sectional area changes; a flow limiter to limit the flow of the viscous fluid in the chamber into the chamber through the communicating hole, when the internal pressure of the viscous fluid accommodated in the chamber has exceeded a fixed value on the basis of the rotation of the partitioning member; and a resilient structure to resiliently urge the partitioning member in a direction with respect to the vessel.

26 Claims, 11 Drawing Sheets

(51) Int. Cl.
*B60N 2/42* (2006.01)
*B60N 2/48* (2006.01)

(56) References Cited

FOREIGN PATENT DOCUMENTS

| JP | 11-268566 | 10/1999 |
| JP | 2003-081044 | 3/2003 |
| JP | 2003-176844 | 6/2003 |
| JP | 2005-225334 | 8/2005 |
| JP | 2006-082772 | 3/2006 |
| JP | 2006-088875 | 4/2006 |
| JP | 2007-290466 | 11/2007 |

OTHER PUBLICATIONS

CD-Rom of the specification and drawings annexed to the request of Japanese Utility Model Application No. 133975/1989, Jul. 22, 1991.
Parent; U.S. Appl. No. 12/989,748, filed on Dec. 1, 2010, Okimura et al.

(a)　　　　　　　　　　　　(b)

DAMPER AND VEHICLE SEAT EQUIPPED WITH THE DAMPER

This application is a divisional of U.S. application Ser. No. 12/989,748, filed on Dec. 1, 2010, now allowed, which is the U.S. National Phase of International Application No. PCT/JP2009/001806, filed on Apr. 20, 2009, which designated the U.S. and claims priority to Japanese Application No. 2008-117912, filed on Apr. 28, 2008, the entire contents of each of which are hereby incorporated by reference.

TECHNICAL FIELD

The present invention relates to a damper for absorbing an impact, and more particular to a damper suitable for use in a vehicle seat having a headrest for supporting the head of a seated person by moving forward when, at the time of such as a collision of a motor vehicle, the seated person moves backward due to inertia upon receiving an impact from the rear, as well as a vehicle seat equipped with the damper.

BACKGROUND ART

Patent Document 1: JP-A-10-181403
Patent Document 2: JP-A-10-119619
Patent Document 3: JP-A-11-268566
Patent Document 4: JP-A-2003-81044
Patent Document 5: JP-A-2003-176844
Patent Document 6: JP-A-2005-225334
Patent Document 7: JP-A-2006-82772
Patent Document 8: JP-A-2006-88875

In motor vehicles, vehicle seats have been proposed in which a headrest is adapted to move forward to restrict the head of a seated person at the time of such as a collision.

DISCLOSURE OF THE INVENTION

Problems that the Invention is to Solve

Incidentally, shock absorbing dampers which are used in such vehicle seats are required to be such that, in the collision at the time of low speed, the impact caused by the collision is absorbed softly in order to support the head so as not to impart the impact, whereas, in the collision at the time of high speed, the impact is absorbed with stiffness corresponding to the magnitude of the impact at the time of the collision so as to absorb the impact due to the collision by becoming stiff in order to support the head reliably.

The present invention has been devised in view of the above-described aspects, and its object is to provide a damper capable of softly absorbing an impact when the impact is small, and of becoming stiff and positively holding an impact-absorbed body, e.g., the head, when the impact is large.

Another object of the invention is to provide a vehicle seat which is capable of positively moving the headrest in the forward direction only at the time of such as a collision by properly discriminating the time of such as a collision and the time of a non-collision, and which can be compactly installed in a backrest and the like.

Means for Solving the Problems

The damper in accordance with the present invention comprises: a vessel for accommodating a viscous fluid in its interior; at least one hampering wall provided in the interior of the vessel to hamper the flow of the viscous fluid in a direction about an axis of the vessel; a partitioning member for partitioning the interior of the vessel accommodating the viscous fluid whose flow has been hampered by the hampering wall into at least two chambers in the direction about the axis, the partitioning member being provided in the interior of the vessel rotatably in the direction about the axis with respect to the vessel; at least one communicating hole formed in the partitioning member so as to allow the two chambers in the interior of the vessel to communicate with each other via a variable passage whose passage cross-sectional area changes; and flow limiting means for limiting the flow of the viscous fluid in the chamber on one direction side in the direction about the axis into the chamber on another direction side in the direction about the axis through the communicating hole when the internal pressure of the viscous fluid accommodated in the chamber on the one direction side in the direction about the axis has exceeded a fixed value on the basis of the rotation of the partitioning member in the one direction in the direction about the axis with respect to the vessel, wherein the flow limiting means includes: a variable passage forming member which has a through hole which, in an end face in the one direction in the direction about the axis of the variable passage forming member, is open to the chamber on the one direction side in the direction about the axis, the variable passage forming member being fitted to the partitioning member movably in such a manner as to oppose, at an end face in another direction in the direction about the axis of the variable passage forming member, a side face in the one direction in the direction about the axis of the partitioning member, so as to form the variable passage communicating with, on one side, the through hole and, on another side, the communicating hole in cooperation with the side face in the one direction in the direction about the axis of the partitioning member; and an annular elastic member surrounding the variable passage and disposed between the end face in the other direction in the direction about the axis of the variable passage forming member and the side face in the one direction in the direction about the axis of the partitioning member, so as to brake the relative rotation in the direction about the axis of the partitioning member with respect to the vessel.

According to the above-described damper, in the case of the input of relative rotation of the partitioning member with respect to the vessel at a low velocity not exceeding a fixed value, the partitioning member is rotated with respect to the vessel in one direction in the direction about the axis at a low velocity not exceeding the fixed value, and the internal pressure of the viscous fluid accommodated in the chamber on the one direction side in the direction about the axis of the vessel does not exceed a fixed value. Therefore, the annular elastic member disposed between the end face in the other direction in the direction about the axis of the variable passage forming member and the side face in the one direction in the direction about the axis of the partitioning member is not greatly deformed elastically, and a large passage cross section of the variable passage is maintained. Thus, the viscous fluid accommodated in the chamber on the one direction side in the direction about the axis is allowed to flow into the chamber on the other direction side through the through hole, the variable passage, and the communicating hole without much resistance. As a result, a resultant damping force, i.e., a reaction force with respect to the input of rotation, is set to a relatively small value based on the flow resistance in the case where the viscous fluid flows through the through hole, the variable passage, and the communicating hole. On the other hand, in the case of the input of high-speed relative rotation of the partitioning member with respect to the vessel in excess of the fixed value, the partitioning member tends to be rotated with respect to the vessel in the one direction in the direction about the axis at a high velocity exceeding the fixed value, and the internal pressure of the viscous fluid accommodated in the chamber on the one direction side in the direction about the axis of the vessel exceeds a fixed value. Therefore, the annular elastic member sandwiched between the end face in the other direction in the direction about the axis of the variable passage forming member and the side face in the one direction in the direction about the axis of the partitioning member is deformed elastically. Hence, the distance in the direction about the axis between the end face in the other direction in the direction about the axis of the variable passage forming member and the side face in the one direction in the direction about the axis of the partitioning member becomes small, so that the passage cross section of the variable passage becomes small. Thus, large resistance occurs in the flow of the viscous fluid accommodated in the chamber on the one direction side in the direction about the axis of the vessel into the chamber on the other direction side in the direction about the axis of the vessel through the through hole, the variable passage, and the communicating hole. As a result, a resultant damping force, i.e., a reaction force with respect to the input of rotation, assumes a magnitude which is based on the compression resistance of the viscous fluid in the chamber on the one direction side in the direction about the axis and the flow resistance of the viscous fluid through the variable passage having the passage cross section which has become small. Thus, in the case of the input of low-speed rotation not exceeding a fixed value in which case the impact is small, the impact is absorbed softly, whereas in the case of the input of high-speed rotation exceeding the fixed value in which case the impact is large, the damper becomes stiff so as to be able to positively hold the impact-absorbed body. Hence, the relative rotation in the direction about the axis of the partitioning member with respect to the vessel can be braked satisfactorily.

In the damper in a preferred example, the variable passage forming member has a plate-like portion having the through hole, a leg portion formed, at its one end portion, integrally on the plate-like portion and inserted in the communicating hole, and a hook portion formed integrally on another end portion of the leg portion so as to prevent the leg portion from coming off the communicating hole. Further, the partitioning member has a truncated conical surface in the side face in the one direction in the direction about the axis, the variable passage forming member has a truncated conical surface which is complementary to the truncated conical surface of the partitioning member and opposes that truncated conical surface, and the variable passage has a truncated conical passage formed by the truncated conical surface of the partitioning member and the truncated conical surface of the variable passage forming member.

The damper in accordance with the present invention comprises: a vessel for accommodating a viscous fluid in its interior; at least one hampering wall provided in the interior of the vessel to hamper the flow of the viscous fluid in a direction about an axis of the vessel; a partitioning member for partitioning the interior of the vessel accommodating the viscous fluid whose flow has been hampered by the hampering wall into at least two chambers in the direction about the axis, the partitioning member being provided in the interior of the vessel rotatably in the direction about the axis with respect to the vessel; at least one communicating hole formed in the partitioning member so as to allow the two chambers in the interior of the vessel to communicate with each other via a variable passage whose passage cross-sectional area changes; and flow limiting means for limiting the flow of the viscous fluid in the chamber on one direction side in the direction about the axis into the chamber on another direction side in the direction about the axis through the communicating hole when the internal pressure of the viscous fluid accommodated in the chamber on the one direction side in the direction about the axis has exceeded a fixed value on the basis of the rotation of the partitioning member in the one direction in the direction about the axis with respect to the vessel, wherein the flow limiting means includes: a variable passage forming member which is movably fitted to the partitioning member and has, in its end face in the other direction in the direction about the axis facing a side face in the one direction in the direction about the axis of the partitioning member, a communicating groove which is open at its one end portion to the chamber on the one direction side in the direction about the axis and is open at its other end portion to the communicating hole; and an annular elastic member which is located between the one end portion and the other end portion of the communicating groove in a radial direction and fitted to the side face in the one direction in the direction about the axis of the partitioning member, such that the variable passage for effecting mutual communication between the two chambers in the vessel by means of the communicating hole by allowing the chamber on the one direction side in the direction about the axis and the communicating hole to communicate is formed by the contact, pressing contact, and non-contact of the annular elastic member with respect to the end face in the other direction in the direction about the axis of the variable passage forming member having the communicating groove, so as to brake the relative rotation in the direction about the axis of the partitioning member with respect to the vessel.

According to the above-described damper, in the case of the input of relative rotation of the partitioning member with respect to the vessel at a low velocity not exceeding a fixed value, the partitioning member is rotated with respect to the vessel in one direction in the direction about the axis at a low velocity not exceeding the fixed value, and the internal pressure of the viscous fluid accommodated in the chamber on the one direction side in the direction about the axis of the vessel does not exceed a fixed value. Therefore, the annular elastic member fitted at the side face in the one direction in the direction about the axis of the partitioning member is not strongly brought into pressing contact and is not greatly deformed elastically by the end face in the other direction in the direction about the axis of the variable passage forming member, with the result that a large passage cross-sectional area is maintained for the variable passage. Thus, the viscous fluid accommodated in the chamber on the one direction side in the direction about the axis is allowed to flow into the chamber on the other direction side in the direction about the axis through the variable passage and the communicating hole without much resistance. As a result, a resultant damping force, i.e., a reaction force with respect to the input of rotation, is set to a relatively small value based on the flow resistance in the case where the viscous fluid flows through the variable passage having a large passage cross-sectional area and the communicating hole. On the other hand, in the case of the input of high-speed relative rotation of the partitioning member with respect to the vessel in excess of the fixed value, the partitioning member tends to be moved with respect to the vessel in the one direction in the direction about the axis at a high velocity exceeding the fixed value, and the internal pressure of the viscous fluid accommodated in the chamber on the one direction side in the direction about the axis of the vessel exceeds a fixed value. Therefore, the annular elastic member located between the end face in the other direction in the direction about the axis of the variable passage forming member and the side face in the one direction in the direction about the axis of the partitioning member is brought into contact with the end face in the other direction in the direction about the axis of the variable passage forming member, so that the variable passage is constituted only by the communicating groove, thereby rendering the passage cross-sectional area of the variable passage small. Further, as the end face in the other direction in the direction about the axis of the variable passage forming member after the contact is further pressed and contacted against the annular elastic member, the annular elastic member is greatly deformed elastically. As the annular elastic member is embedded into the communicating groove by this large elastic deformation of the annular elastic member, the passage cross-sectional area of the variable passage becomes even smaller. Thus, large resistance occurs in the flow of the viscous fluid accommodated in the chamber on the one direction side in the direction about the axis of the vessel into the chamber on the other direction side in the direction about the axis of the vessel through the variable passage and the communicating hole. As a result, a resultant damping force, i.e., a reaction force with respect to the input of rotation, assumes a magnitude which is based on the compression resistance of the viscous fluid in the chamber on the one direction side in the direction about the axis and the flow resistance of the viscous fluid through the variable passage having the passage cross-sectional area which has become small. Thus, in the case of the input of low-speed rotation not exceeding a fixed value in which case the impact is small, the impact is absorbed softly, whereas in the case of the input of high-speed rotation exceeding the fixed value in which case the impact is large, the damper becomes stiff so as to be able to positively hold the impact-absorbed body. Hence, the relative rotation in the direction about the axis of the partitioning member with respect to the vessel can be braked satisfactorily.

In the above-described damper in another preferred example, the variable passage forming member has a plate-like portion having the communicating groove, a leg portion formed, at its one end portion, integrally on the plate-like portion and inserted in the communicating hole, and a hook portion formed integrally on another end portion of the leg portion so as to prevent the leg portion from coming off the communicating hole. Further, when the internal pressure of the viscous fluid accommodated in the chamber in the other direction in the direction about the axis is generated in excess of a fixed value on the basis of the rotation of the partitioning member in the other direction in the direction about the axis with respect to the vessel, the end face in the other direction in the direction about the axis of the variable passage forming member is adapted to move away from the annular elastic member. Furthermore, when the internal pressure of the viscous fluid accommodated in the chamber on the one direction side in the direction about the axis is generated in excess of a fixed value on the basis of the rotation of the partitioning member in the one direction in the direction about the axis with respect to the vessel, the annular elastic member is adapted to be elastically deformed to fill the communicating groove and reduce the passage cross-sectional area of the variable passage.

The above-described damper which is adapted to brake the relative rotation in the direction about the axis of the partitioning member with respect to the vessel may further comprise resilient means for resiliently urging the partitioning member in the other direction in the direction about the axis with respect to the vessel.

Still another damper in accordance with the present invention comprises: a vessel for accommodating a viscous fluid in its interior; a partitioning member provided in the interior of the vessel linearly movably in an axial direction with respect to the vessel to partition the interior of the vessel for accommodating the viscous fluid into at least two chambers in the axial direction; at least one communicating hole formed in the partitioning member so as to allow the two chambers in the interior of the vessel to communicate with each other through a variable passage whose passage cross-sectional area changes; flow limiting means for limiting the flow of the viscous fluid in the chamber on one direction side in the axial direction into the chamber on another direction side in the axial direction through the communicating hole when the internal pressure of the viscous fluid accommodated in the chamber on the one direction side in the axial direction has exceeded a fixed value on the basis of the linear movement of the partitioning member in one direction in the axial direction with respect to the vessel, wherein the flow limiting means includes: a variable passage forming member which has a through hole which, in an end face in the one direction in the axial direction of the variable passage forming member, is open to the chamber on the one direction side in the axial direction, the variable passage forming member being fitted to the partitioning member movably in such a manner as to oppose, at an end face in another direction in the axial direction of the variable passage forming member, a side face in the one direction in the axial direction of the partitioning member, so as to form the variable passage communicating with, on one side, the through hole and, on another side, the communicating hole in cooperation with the side face in the one direction in the axial direction of the partitioning member; and an annular elastic member surrounding the variable passage and disposed between the end face in the other direction in the axial direction of the variable passage forming member and the side face in the one direction in the axial direction of the partitioning member, so as to brake the relative linear movement in the axial direction of the partitioning member with respect to the vessel.

According to the above-described damper, in the case of the input of relative linear motion of the partitioning member with respect to the vessel at a low velocity not exceeding a fixed value, the partitioning member is linearly moved with respect to the vessel in one direction in the axial direction at a low velocity not exceeding the fixed value, and the internal pressure of the viscous fluid accommodated in the chamber on the one direction side in the axial direction of the vessel does not exceed a fixed value. Therefore, the annular elastic member disposed between the end face in the other direction in the axial direction of the variable passage forming member and the side face in the one direction in the axial direction of the partitioning member is not greatly deformed elastically, and a large passage cross section of the variable passage is maintained. Thus, the viscous fluid accommodated in the chamber on the one direction side in the axial direction is allowed to flow into the chamber on the other direction side through the through hole, the variable passage, and the communicating hole without much resistance. As a result, a resultant damping force, i.e., a reaction force with respect to the input of linear motion, is set to a relatively small value based on the flow resistance in the case where the viscous fluid flows through the through hole, the variable passage, and the communicating hole. On the other hand, in the case of the input of high-speed relative linear motion of the partitioning member with respect to the vessel in excess of the fixed value, the partitioning member tends to be moved linearly with respect to the vessel in the one direction in the axial direction at a high velocity exceeding the fixed value, and the internal pressure of the viscous fluid accommodated in the chamber on the one direction side in the axial direction of the vessel exceeds a fixed value. Therefore, the annular elastic member sandwiched between the end face in the other direction in the axial direction of the variable passage forming member and the side face in the one direction in the axial direction of the partitioning member is deformed elastically. Hence, the distance in the axial direction between the end face in the other direction in the axial direction of the variable passage forming member and the side face in the one direction in the axial direction of the partitioning member becomes small, so that the passage cross section of the variable passage becomes small. Thus, large resistance occurs in the flow of the viscous fluid accommodated in the chamber on the one direction side in the axial direction of the vessel into the chamber on the other direction side in the axial direction of the vessel through the through hole, the variable passage, and the communicating hole. As a result, a resultant damping force, i.e., a reaction force with respect to the input of linear motion, assumes a magnitude which is based on the compression resistance of the viscous fluid in the chamber on the one direction side in the axial direction and the flow resistance of the viscous fluid through the variable passage having the passage cross section which has become small. Thus, in the case of the input of low-speed linear motion not exceeding a fixed value in which case the impact is small, the impact is absorbed softly, whereas in the case of the input of high-speed linear motion exceeding the fixed value in which case the impact is large, the damper becomes stiff so as to be able to positively hold the impact-absorbed body. Hence, the relative rotation in the axial direction of the partitioning member with respect to the vessel can be braked satisfactorily.

In still another preferred example of the above-described damper, the variable passage forming member has a plate-like portion having the through hole, a leg portion formed, at its one end portion, integrally on the plate-like portion and inserted in the communicating hole, and a hook portion formed integrally on another end portion of the leg portion so as to prevent the leg portion from coming off the communicating hole. Further, the partitioning member has a truncated conical surface in the side face in the one direction in the axial direction, the variable passage forming member has a truncated conical surface which is complementary to the truncated conical surface of the partitioning member and opposes that truncated conical surface, and the variable passage has a truncated conical passage formed by the truncated conical surface of the partitioning member and the truncated conical surface of the variable passage forming member.

A further damper in accordance with the present invention comprises: a vessel for accommodating a viscous fluid in its interior; a partitioning member provided in the interior of the vessel linearly movably in an axial direction with respect to the vessel to partition the interior of the vessel for accommodating the viscous fluid into at least two chambers in the axial direction; at least one communicating hole formed in the partitioning member so as to allow the two chambers in the interior of the vessel to communicate with each other through a variable passage whose passage cross-sectional area changes; flow limiting means for limiting the flow of the viscous fluid in the chamber on one direction side in the axial direction into the chamber on another direction side in the axial direction through the communicating hole when the internal pressure of the viscous fluid accommodated in the chamber on the one direction side in the axial direction has exceeded a fixed value on the basis of the linear movement of the partitioning member in one direction in the axial direction with respect to the vessel, wherein the flow limiting means includes: a variable passage forming member which is movably fitted to the partitioning member and has, in its end face in another direction in the axial direction facing a side face in the one direction in the axial direction of the partitioning member, a communicating groove which is open at its one end portion to the chamber on the one direction side in the axial direction and is open at its other end portion to the communicating hole; and an annular elastic member which is located between the one end portion and the other end portion of the communicating groove in a radial direction and fitted to the side face in the one direction in the axial direction of the partitioning member, such that the variable passage for effecting mutual communication between the two chambers in the vessel by means of the communicating hole by allowing the chamber on the one direction side in the axial direction and the communicating hole to communicate is formed by the contact, pressing contact, and non-contact of the annular elastic member with respect to the end face in the other direction in the axial direction of the variable passage forming member having the communicating groove, so as to brake the relative linear movement in the axial direction of the partitioning member with respect to the vessel.

According to the above-described damper, in the case of the input of relative linear motion of the partitioning member with respect to the vessel at a low velocity not exceeding a fixed value, the partitioning member is linearly moved with respect to the vessel in one direction in the axial direction at a low velocity not exceeding the fixed value, and the internal pressure of the viscous fluid accommodated in the chamber on the one direction side in the axial direction of the vessel does not exceed a fixed value. Therefore, the annular elastic member fitted at the side face in the one direction in the axial direction of the partitioning member is not greatly deformed elastically by the end face in the other direction in the axial direction of the variable passage forming member, with the result that a large passage cross-sectional area is maintained for the variable passage. Thus, the viscous fluid accommodated in the chamber on the one direction side in the axial direction is allowed to flow into the chamber on the other direction side in the axial direction through the variable passage and the communicating hole without much resistance. As a result, a resultant damping force, i.e., a reaction force with respect to the input of linear motion, is set to a relatively small value based on the flow resistance in the case where the viscous fluid flows through the variable passage having a large passage cross-sectional area and the communicating hole. On the other hand, in the case of the input of high-speed relative linear motion of the partitioning member with respect to the vessel in excess of the fixed value, the partitioning member tends to be moved with respect to the vessel in the one direction in the axial direction at a high velocity exceeding the fixed value, and the internal pressure of the viscous fluid accommodated in the chamber on the one direction side in the axial direction of the vessel exceeds a fixed value. Therefore, the annular elastic member located between the end face in the other direction in the axial direction of the variable passage forming member and the side face in the one direction in the axial direction of the partitioning member is brought into contact with the end face in the other direction in the axial direction of the variable passage forming member, so that the variable passage is constituted only by the communicating groove, thereby rendering the passage cross-sectional area of the variable passage small. Further, as the end face in the other direction in the axial direction of the variable passage forming member after the contact is further pressed and contacted against the annular elastic member, the annular elastic member is not strongly brought into pressing contact and is greatly deformed elastically. As the annular elastic member is embedded into the communicating groove by this large elastic deformation of the annular elastic member, the passage cross-sectional area of the variable passage becomes even smaller. Thus, large resistance occurs in the flow of the viscous fluid accommodated in the chamber on the one direction side in the axial direction of the vessel into the chamber on the other direction side in the axial direction of the vessel through the variable passage and the communicating hole. As a result, a resultant damping force, i.e., a reaction force with respect to the input of linear motion, assumes a magnitude which is based on the compression resistance of the viscous fluid in the chamber on the one direction side in the axial direction and the flow resistance of the viscous fluid through the variable passage having the passage cross-sectional area which has become small. Thus, in the case of the input of low-speed linear motion not exceeding a fixed value in which case the impact is small, the impact is absorbed softly, whereas in the case of the input of high-speed linear motion exceeding the fixed value in which case the impact is large, the damper becomes stiff so as to be able to positively hold the impact-absorbed body. Hence, the relative linear motion in the axial direction of the partitioning member with respect to the vessel can be braked satisfactorily.

According to a further preferred example of the damper, the variable passage forming member has a plate-like portion having the communicating groove, a leg portion formed, at its one end portion, integrally on the plate-like portion and inserted in the communicating hole, and a hook portion formed integrally on another end portion of the leg portion so as to prevent the leg portion from coming off the communicating hole. Further, when the internal pressure of the viscous fluid accommodated in the chamber in the other direction in the axial direction is generated in excess of a fixed value on the basis of the linear movement of the partitioning member in the other direction in the axial direction with respect to the vessel, the end face in the other direction in the axial direction of the variable passage forming member is adapted to move away from the annular elastic member. Still further, when the internal pressure of the viscous fluid accommodated in the chamber on the one direction side in the axial direction is generated in excess of a fixed value on the basis of the linear movement of the partitioning member in the one direction in the axial direction with respect to the vessel, the annular elastic member is adapted to be elastically deformed to fill the communicating groove and reduce the passage cross-sectional area of the variable passage.

The damper which is adapted to brake the relative linear motion in the axial direction of the partitioning member with respect to the vessel may also further comprise resilient means for resiliently urging the partitioning member in the other direction in the axial direction with respect to the vessel.

In any one of the above-described dampers, the annular elastic member in a preferred example is constituted by an O-ring formed of natural rubber or synthetic rubber whose modulus of elasticity is small at a high temperature (the annular elastic member becomes soft) and large at a low temperature (the annular elastic member becomes hard). The annular elastic member formed such an O-ring undergoes large elastic deformation at high temperature and small elastic deformation at low temperature. As a result, coupled with the synergistic action with the viscous fluid having a positive temperature characteristic concerning fluidity whereby the fluidity increases at high temperature and the fluidity decreases at low temperature, it is possible to reduce the temperature dependence of the flow resistance of the viscous fluid flowing through the variable passage having a passage cross-sectional area determined by the elastic deformation of the annular elastic member. Thus, it is possible to reduce the difference, for instance, between, on the one hand, the stiffness of the damper in the direction about the axis or in the axial direction in the case of an input of high-speed rotation or linear movement exceeding a fixed value in which case the impact becomes large at high temperature and, on the other hand, the stiffness of the damper in the direction about the axis or in the axial direction in the case of an input of high-speed rotation or linear movement exceeding the fixed value in which case the impact becomes large at low temperature. Hence, it becomes possible to positively hold the impact-absorbed body with stiffness which does not differ so much both at high temperature and at low temperature with respect to the direction about the axis or the axial direction. In the invention, the annular elastic member is not limited to one constituted by an O-ring formed of natural rubber or synthetic rubber, and may be formed of an elastic material such as polyurethane rubber, acrylic rubber, silicone rubber, polyester elastomer, or the like. Furthermore, the annular elastic member may be constituted by a ring or the like whose cross-sectional shape is of a square type, a Y-type, a U-type, a V-type, or an X-type.

As the viscous fluid used in the invention, silicone oil of 100 to 1000 cst is suitable, but is not limited to the same.

Furthermore, a vehicle seat in accordance with the present invention comprises: a backrest of a vehicle; a headrest supported by the backrest movably in a forward direction of the vehicle; movement urging means for urging the headrest to move in the forward direction; and an inhibition mechanism for inhibiting the movement of the headrest in the forward direction; and canceling means for canceling the inhibition by the inhibition mechanism of the movement of the headrest in the forward direction when a moving velocity of a force applied to the backrest in a backward direction of the vehicle has exceeded a fixed value, the canceling means having a load-rotation converting mechanism for converting a load applied to a back receiving portion of the backrest into a rotational force and a transmitting mechanism for transmitting to the inhibition mechanism a force applied to the backrest in the backward direction of the vehicle on the basis of the moving velocity exceeding the fixed value, the transmitting mechanism having the damper according to any one of claims 1 to 15, wherein one of the vessel and the partitioning member of the damper is coupled to the load-rotation converting mechanism, and another one of the vessel and the partitioning member of the damper is coupled to the inhibition mechanism.

According to the vehicle seat in accordance with the above-described aspect of the invention, the canceling means, which cancels the inhibition by the inhibition mechanism of the movement of the headrest in the forward direction when a moving velocity of a force applied to the backrest in a backward direction of the vehicle has exceeded a fixed value, has a transmitting mechanism for transmitting to the inhibition mechanism a force applied to the backrest in the backward direction of the vehicle on the basis of the moving velocity exceeding the fixed value. Moreover, since the transmitting mechanism has the damper according to any one of the above-described forms, it is possible to positively move the headrest in the forward direction only at the time of such as a collision by properly discriminating the time of such as a collision and the time of a non-collision, and the damper and the like can be compactly installed in the backrest and the like.

The load-rotation converting mechanism may have a load receiving plate supported rotatably by a frame of the backrest and disposed in the back receiving portion of the backrest. Further, the headrest may be supported by the backrest rotatably or linearly movably in the forward direction, the movement urging means may be adapted to urge the headrest to rotate or linearly move in the forward direction, and the inhibition mechanism may be adapted to inhibit the rotation or linear movement of the headrest in the forward direction.

Advantages of the Invention

According to the invention, it is possible to provide a damper capable of softly absorbing an impact when the impact is small, and of becoming stiff and positively holding an impact-absorbed body, e.g., the head, when the impact is large. In addition, it is possible to provide a vehicle seat equipped with a damper which is capable of positively moving the headrest in the forward direction only at the time of such as a collision by properly discriminating the time of such as a collision and the time of a non-collision, and in which the damper and the like can be compactly installed in the backrest and the like.

BEST MODE FOR CARRYING OUT THE INVENTION

Figure 1:
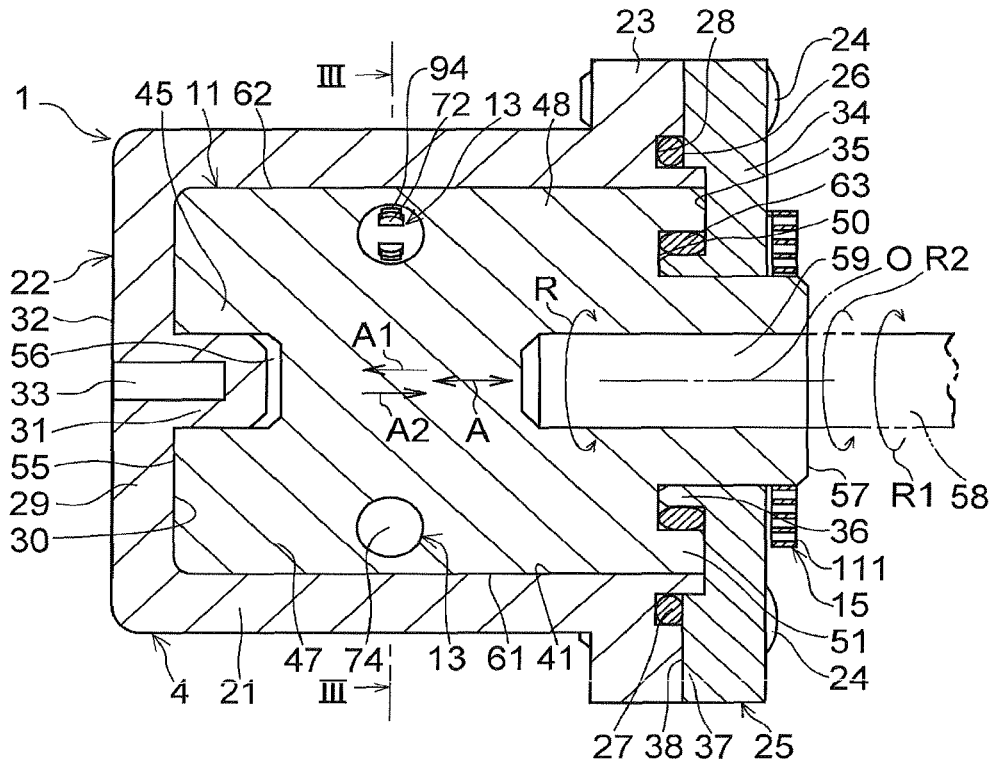
FIG. 1 is an explanatory cross-sectional view, taken in the direction of arrows along line I-I shown in FIG. 3, of a preferred embodiment of the invention.
Figure 2:
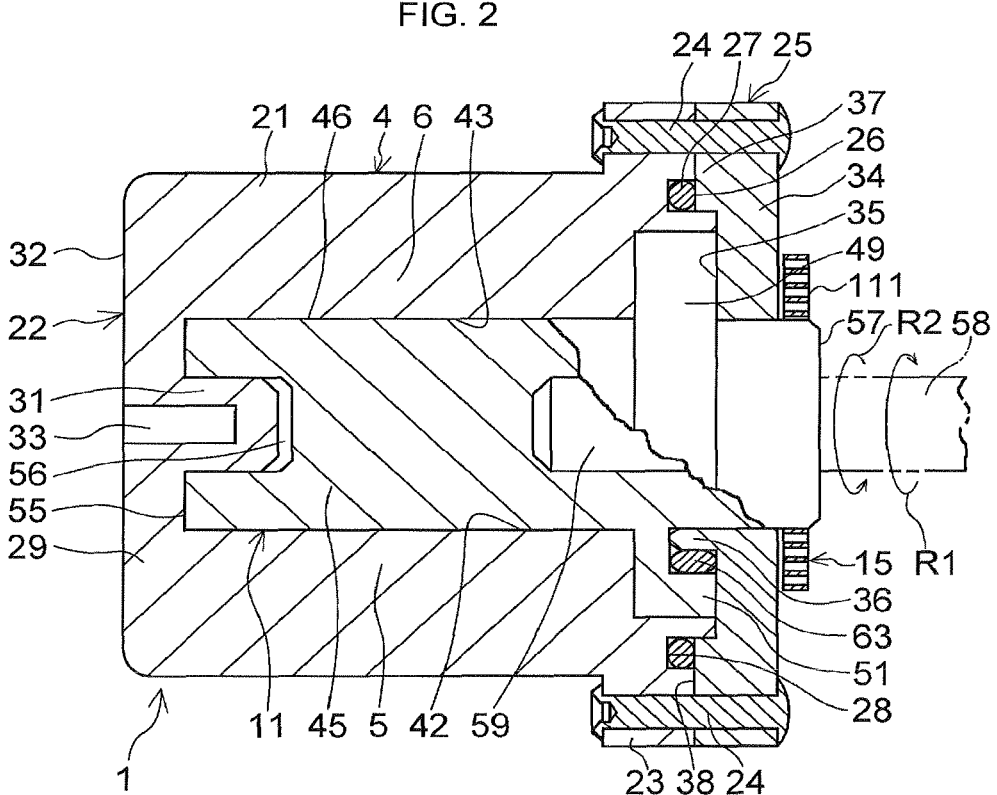
FIG. 2 is an explanatory cross-sectional view, taken in the direction of arrows along line II-II shown in FIG. 3, of the embodiment shown in FIG. 1.
Figure 3:
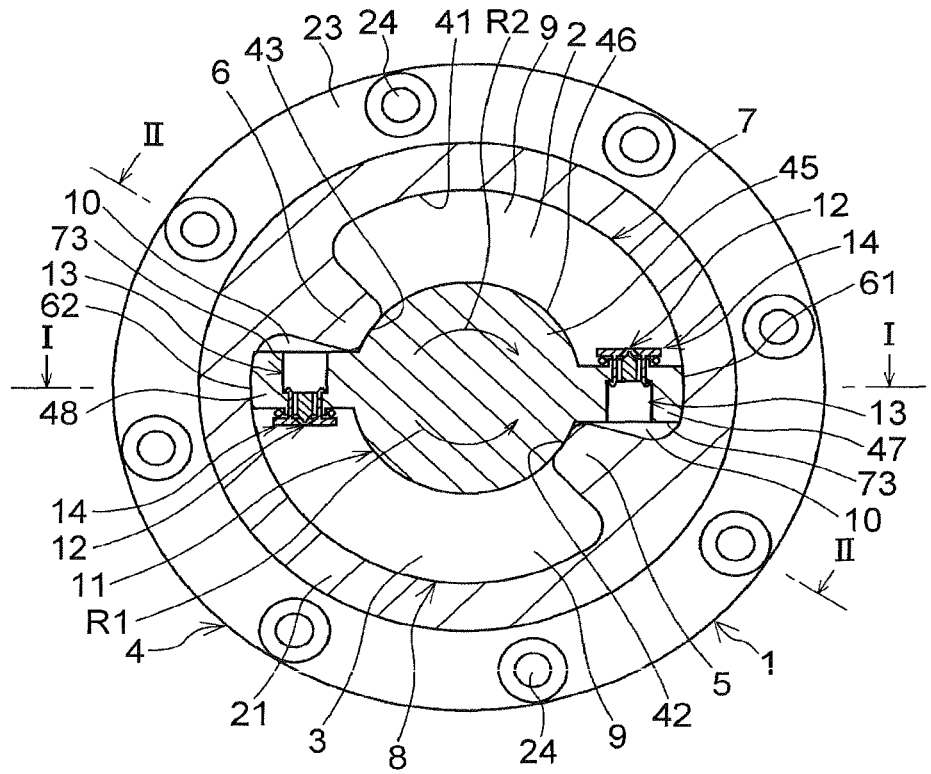
FIG. 3 is an explanatory cross-sectional view, taken in the direction of arrows along line III-III, of the embodiment shown in FIG. 1.

Hereafter, a more detailed description will be given of the present invention and the mode for carrying it out with reference to the preferred embodiments shown in the drawings. It should be noted that the present invention is not limited to these embodiments.

In FIGS. 1 to 7, a damper 1 in accordance with this embodiment is comprised of a vessel 4 for accommodating a viscous fluid 3 in its interior 2 and having an axis O; at least one hampering wall, in this embodiment two hampering walls 5 and 6, which are provided in the interior 2 of the vessel 4 to hamper the flow of the viscous fluid 3 in an R1 direction and an R2 direction which are one and the other direction in a direction R about the axis O of the vessel 4; a partitioning member 11 whereby each of interior portions 7 and 8 split into two concerning the R1 and R2 directions by the hampering walls 5 and 6 in the interior 2 of the vessel 4 accommodating the viscous fluid 3 whose flow has been hampered by the hampering walls 5 and 6 is partitioned into two chambers 9 and 10 in the R1 and R2 directions, the partitioning member 11 being provided in the interior 2 of the vessel 4 rotatably in the R1 and R2 directions with respect to that vessel 4; a communicating hole 13 formed in the partitioning member 11 so as to allow the two chambers 9 and 10 in the interior 2 of the vessel 4 to communicate with each other via a variable passage 12 whose passage cross-sectional area changes; a flow limiting means 14 for limiting the flow of the viscous fluid 3 in the chamber 9 on the R1 direction side into the chamber 10 on the R2 direction side, which is the other direction in the direction about the axis O, through the communicating hole 13, when the internal pressure of the viscous fluid 3 accommodated in the chamber 9 on the R1 direction side has exceeded a fixed value on the basis of the rotation of the partitioning member 11 in the R1 direction, which is one direction in the direction about the axis O, with respect to the vessel 4; and a resilient means 15 for resiliently urging the partitioning member 11 in the R2 direction with respect to the vessel 4.

The vessel 4 includes a hollow cylindrical portion 21; a bottom portion 22 which is integrally provided at one end in an A1 direction, i.e., one direction in an axial direction A, of the hollow cylindrical portion 21, and which closes the open plane in the A1 direction of the hollow cylindrical portion 21; an outer peripheral collar portion 23 which is integrally provided at one end in an A2 direction, i.e., the other direction in the direction about the axis A; and an annular closure member 25 which is secured to the collar portion 23 by rivets or screws 24 and closes the open plane in the A2 direction of the hollow cylindrical portion 21.

The hollow cylindrical portion 21 has an annular notch 28 formed at an annular end face 26 in the A2 direction so as to accommodate a seal ring 27 constituted by an O-ring. The bottom portion 22 includes a disk-shaped body 29 formed integrally on the hollow cylindrical portion 21; a shaft portion 31 formed integrally on the body 29 in such a manner as to project from a central portion of a side face 30 in the A2 direction of the body 29 into the interior 2 in the A2 direction; and a bottomed hole 33 which is provided in a central portion of the body 29 and a central portion of the shaft portion 31 and into which a support shaft, a connecting member or the like is inserted from an opening of a side face 32 in the A1 direction of the body 29 and is fitted therein. The closure member 25 integrally has an annular body 34, a hollow cylindrical portion 36 projecting in the A1 direction from an inner peripheral side of a side face 35 in the A1 direction of the body 34, and a hollow cylindrical portion 37 projecting in the A1 direction from an outer peripheral side of the side face 35 in the A1 direction of the body 34, the closure member 25 being secured to the collar portion 23 by the rivets or screws 24 at outer peripheral side portions of the body 34 and the hollow cylindrical portion 37. The seal ring 27 fitted in the notch 28 is pressed by an annular end face 38 in the A1 direction of the hollow cylindrical portion 37.

The hampering walls 5 and 6, which are integrally formed on a cylindrical inner peripheral surface 41 of the hollow cylindrical portion 21 in such a manner as to project from that inner peripheral surface 41 toward the axis O, extend in the direction about the axis A, and oppose each other in the radial direction, respectively have sliding end faces 42 and 43 on their radially inner sides. The hampering walls are not limited to the two hampering walls which are arranged at an equiangular interval of 180° in the direction R as in this embodiment, and the number thereof may be one, or three or more which are arranged preferably at equiangular intervals in the direction R.

The partitioning member 11 includes a columnar main body 45 which is passed through the closure member 25; two blade portions 47 and 48 which are integrally formed on a cylindrical outer peripheral surface 46 of the main body 45 in such a manner as to project from that outer peripheral surface 46 in the radially outward direction, extend in the direction about the axis A, and oppose each other in the radial direction symmetrically about the axis O; a collar portion 49 which is integrally formed on the main body 45 and the blade portions 47 and 48 disposed in the interior 2; and a hollow cylindrical portion 51 which is integrally formed on a side face 50 in the A2 direction of the collar portion 49 and extends in such a manner as to project from that side face 50 in the A2 direction, and which has a greater diameter than the hollow cylindrical portion 36 and surrounds the hollow cylindrical portion 36.

The main body 45 has a cylindrical bottomed hole 56 which is bored in an end face 55 in the A1 direction and is adapted to rotatably receive the shaft portion 31, as well as a bottomed hole 59 which is bored in an end face 57 in the A2 direction and into which a rotating shaft 58 is fitted and mounted. The outer peripheral surface 46 of the main body 45 is in liquid-tight contact with the sliding end faces 42 and 43 on the radially inner sides of the hampering walls 5 and 6 slidably in the R1 and R2 directions. Each of sliding end faces 61 and 62 on respective radially outer sides of the blade portions 47 and 48 is in liquid-tight contact with the inner peripheral surface 41 of the hollow cylindrical portion 21 slidably in the R1 and R2 directions. A seal ring 63 is disposed between the hollow cylindrical portion 51 and the hollow cylindrical portion 36.

The partitioning member 11 which thus integrally has the main body 45, the blade portions 47 and 48, the collar portion 49, and the hollow cylindrical portion 51 is supported at its main body 45 by the closure member 25 and the shaft portion 31 rotatably in the R1 and R2 directions, and is relatively rotatable in the R1 and R2 directions with respect to the vessel 4. Hence, as the rotating shaft 58 fitted in the bottomed hole 59 is rotated in the R1 and R2 directions, the partitioning member 11 is adapted to be rotated in the same directions.

In this embodiment, the interior 2 is partitioned into two interior portions 7 and 8 in the direction R about the axis by the two hampering walls 5 and 6, and each of the interior portions 7 and 8 is partitioned into the two chambers 9 and 10 in the R1 and R2 directions by the blade portions 47 and 48 respectively disposed in the interior portions 7 and 8. However, in a case where the flow in the R1 direction and the R2 direction of the viscous fluid 3 in the interior 2 is hampered by one hampering wall, the interior 2 may be partitioned into the two chambers 9 and 10 by one blade portion, or the interior 2 may be partitioned into three or more chambers by a plurality of blade portions. Still further, the interior 2 may be partitioned into two or more interior portions where the flow of the viscous fluid 3 in the R1 direction and the R2 direction is hampered by two or more hampering walls, and two or more blade portions may be disposed in each of the interior portions thus partitioned into two or more so as to partition each of these interior portions into three or more chambers.

Since the blade portion 47 side and the blade portion 48 side are constructed identically in this embodiment, the blade portion 47 side will hereafter be described in detail, and the blade portion 48 side will be described as required.

The blade portion 47 has a plate-like body 65 which has the sliding end face 61 at its radially outer free end and is formed integrally on the main body 45 at its radially inner end. As shown in particular detail in FIGS. 4 to 6, the blade portion 47 further includes, in addition to the plate-like body 65, a disk-shaped portion 67 projecting integrally from a side face 66 in the R1 direction of the plate-like body 65; a truncated conical portion 70 projecting in the R1 direction integrally from an end face 68 in the R1 direction of the disk-shaped portion 67 and having a truncated conical surface 69; a columnar projection 71 projecting integrally from a projecting end in the R1 direction of the truncated conical portion 70; a pair of through holes 72 penetrating the plate-like body 65 and the disk-shaped portion 67 and opposing each other in the radial direction; and a circular hole 74 which communicates at one end thereof with the through holes 72 and communicates at the other end thereof, i.e., at a side face 73 in the R2 direction of the plate-like body 65, with the chamber 10 and is open thereat. Thus, the partitioning member 11, i.e., the blade portion 47, has on its side faces 75 in the R1 direction the side face 66, the end face 68, and the truncated conical surface 69, and the communicating hole 13 of the partitioning member 11 is constituted by the pair of through holes 72 and the circular hole 74.

As shown in particular detail in FIGS. 4 to 7, the flow limiting means 14, which is adapted to brake the relative rotation in the R direction of the partitioning member 11 with respect to the vessel 4, includes a variable passage forming member 85 which has a through hole 82 which, in an end face 81 in the R1 direction, is open to the chamber 9 on the R1 direction side, the variable passage forming member 85 being fitted to the blade portion 47 movably with respect to the blade portion 47 in such a manner as to oppose, at its end face 84 in the R2 direction, the side face 66, the end face 68, and the truncated conical surface 69 among the side faces 75 in the R1 direction of the blade portion 47, so as to form the variable passage 12 communicating with, on the one side, the through hole 82 and, on the other side, the pair of through holes 72 of the communicating hole 13 in cooperation with the end face 68 and the truncated conical surface 69 among the side faces 75 in the R1 direction of the blade portion 47; and an annular elastic member 86 constituted by an O-ring or the like and surrounding the disk-shaped portion 67 and the variable passage 12, the annular elastic member 86 being disposed between the end face 84 in the R2 direction of the variable passage forming member 85 and the side face 75 in the R1 direction of the blade portion 47.

The variable passage forming member 85 has a circular plate-like portion 91 having the through hole 82 with the columnar projection 71 disposed therein; a pair of leg portions 92 formed, at their one ends, integrally on the plate-like portion 91 and respectively inserted in the through holes 72; and hook portions 94 which are respectively formed integrally on other end portions of the leg portions 92 projecting from the other ends of the through holes 72 and are engaged, at the other ends of the through holes 72, with an annular stepped surface 93 of the blade portion 47, so as to prevent the leg portions 92 from coming off the through holes 72.

The end face 84 has an annular flat surface 100 with which one ends of the leg portions 92 are integrally formed and which are brought into contact with the end face 68 and the annular elastic member 86 radially outwardly of the leg portions 92; and a truncated conical surface 101 which is surrounded by the flat surface 100, is complementary to the truncated conical surface 69 of the partitioning member 11, opposes that truncated conical surface 69, and is brought into contact with the truncated conical surface 69.

Figure 10:
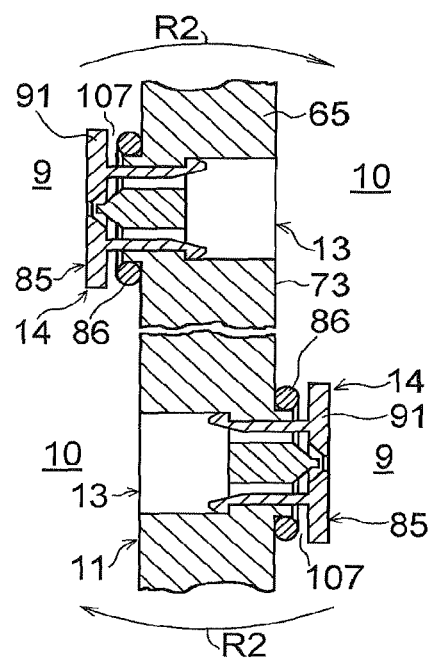
FIG. 10 is a diagram explaining the operation of the embodiment shown in FIG. 1.

The variable passage 12 has a truncated conical passage 105 formed by the truncated conical surface 69 of the partitioning member 11 and the truncated conical surface 101 of the variable passage forming member 85; an inner annular passage 106 communicating with the truncated conical passage 105 and formed by the end face 68 of the partitioning member 11 and the flat surface 100 of the variable passage forming member 85 radially inwardly of the leg portion 92; and an outer annular passage 107 (see FIG. 10) communicating with the inner annular passage 106 and formed by the end face 68 of the partitioning member 11 and the flat surface 100 of the variable passage forming member 85 radially outwardly of the leg portions 92. The truncated conical passage 105 communicates with the chamber 9 through an annular gap between the columnar projection 71 disposed in the through hole 82 and the plate-like portion 91 in that through hole 82, and the inner annular passage 106 communicates with the pair of through holes 72 of the communicating hole 13, while the outer annular passage 107 at its radially outer edge communicates with the chamber 9 when the contact of the flat surface 100 with the annular elastic member 86 is canceled, as shown in FIG. 10.

The annular elastic member 86 is constituted by an O-ring formed of natural rubber or synthetic rubber whose modulus of elasticity is small at a high temperature (the annular elastic member becomes soft) and large at a low temperature (the annular elastic member becomes hard). The annular elastic member 86 at its side face 108 in the R2 direction is in contact with the side face 66, and the annular elastic member 86 at its inner peripheral surface 109 on the radially inner side is elastically fitted to a cylindrical outer peripheral surface 110 on the radially outer side of the disk-shaped portion 67, the annular elastic member 86 being disposed in such a manner as to partially project from the end face 68 in the R1 direction.

The resilient means 15 has a spring (spiral spring) 111 in which an elongated plate having one end secured and connected on the outer side of the vessel 4 to the annular body 34 of the closure member 25 and the other end secured and connected to the main body 45 of the partitioning member 11 is wound in coil form. The arrangement provided is such that the partitioning member 11 is rotated in the R2 direction by the resiliency of the spiral spring 111 to thereby return to its initial position.

Figure 4:
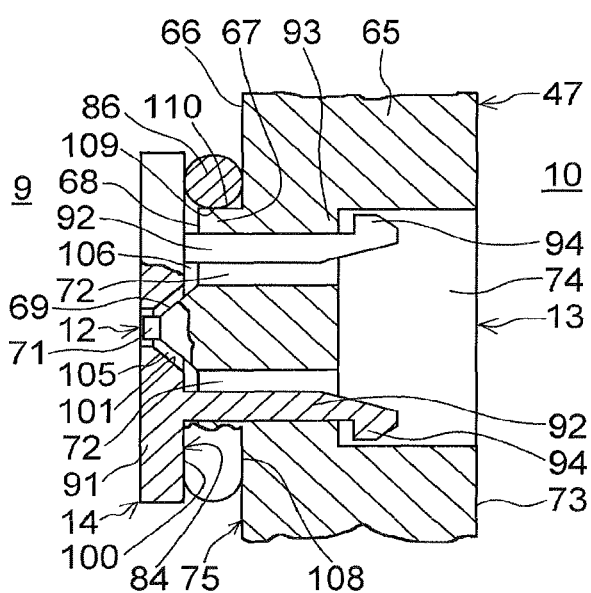
FIG. 4 is an explanatory partial enlarged view of the embodiment shown in FIG. 1.
Figure 5:
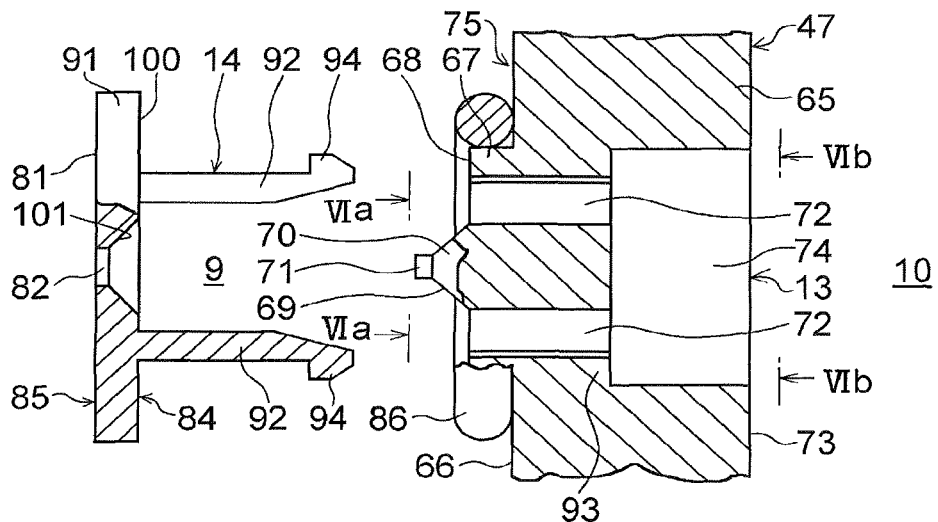
FIG. 5 is an explanatory exploded view of the embodiment shown in FIG. 4.
Figure 6:
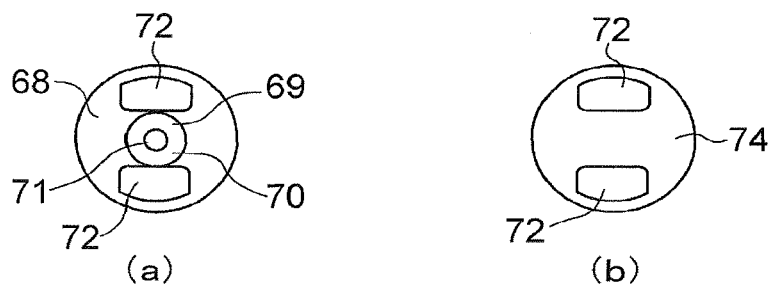
FIG. 6(a) is an explanatory view taken in the direction of arrows along line VIa-VIa shown in FIG. 5.
FIG. 6(b) is an explanatory view taken in the direction of arrows along line VIb-VIb shown in FIG. 5, both in the embodiment shown in FIG. 5.
Figure 7:
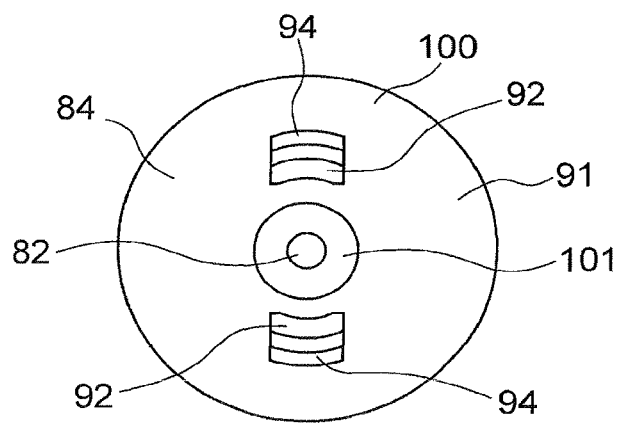
FIG. 7 is a right side elevational view of a variable passage forming member shown in FIG. 5.
Figure 8:
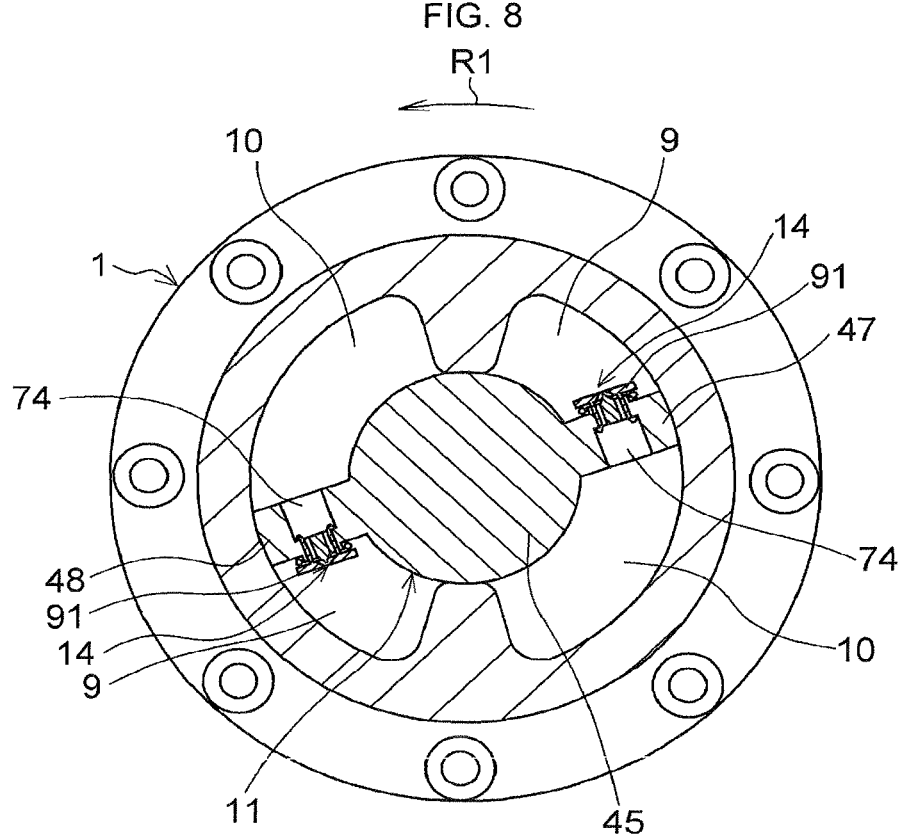
FIG. 8 is a diagram explaining the operation of the embodiment shown in FIG. 1.
Figure 9:
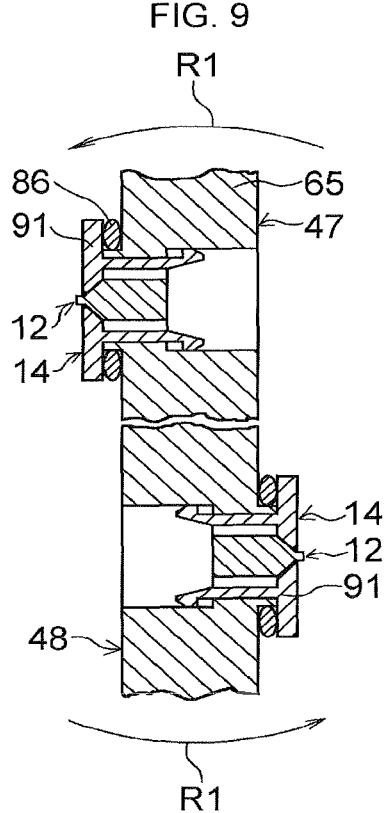
FIG. 9 is a diagram explaining the operation of the embodiment shown in FIG. 1.

In the slow, low-speed rotation in the R1 direction of the partitioning member 11 in which the internal pressure of the viscous fluid 3 in the chamber 9 is not very large relative to the internal pressure of the viscous fluid 3 in the chamber 10, i.e., in the input of relative low-speed rotation in the R1 direction from the rotating shaft 58 against the resiliency of the spiral spring 111, the flow limiting means 14 causes the flat surface 100 to be brought into pressing contact with the annular elastic member 86 in contact with the side face 66, to such an extent that the annular elastic member 86 is not greatly deformed elastically in its cross section diameter by the internal pressure of the viscous fluid 3 in the chamber 9, as shown in FIG. 4, to thereby block the outer annular passage 107 and hamper the communication of the chamber 9 with the chamber 10 through the outer annular passage 107. Meanwhile, the chamber 9 is communicated with the chamber 10 through the truncated conical passage 105 and the inner annular passage 106 each having a passage cross section determined by the cross section diameter of the annular elastic member 86 which is not greatly deformed elastically in its cross section diameter, as well as through the annular gap between the columnar projection 71 and the plate-like portion 91 in the through hole 82 and through the communicating holes 13. A small resisting force is thus generated for the slow rotation of the partitioning member 11 in the R1 direction by allowing the flow of the viscous fluid 3 from the chamber 9 into the chamber 10 by the above-described communication, as shown in FIG. 8.

In the high-speed rotation in the R1 direction of the partitioning member 11 in which the internal pressure of the viscous fluid 3 in the chamber 9 becomes extremely large relative to the internal pressure of the viscous fluid 3 in the chamber 10, i.e., in the input of relative high-speed rotation in the R1 direction from the rotating shaft 58, the flow limiting means 14 causes the plate-like portion 91 of the variable passage forming member 85 to move toward the annular elastic member 86 by the large internal pressure of the chamber 9, and causes the plate-like portion 91 to be pressed against the annular elastic member 86 so as to allow the annular elastic member 86 to be greatly deformed elastically in its cross section diameter owing to this movement, thereby narrowing the passage cross-sectional areas of the truncated conical passage 105 and the inner annular passage 106. The chamber 9 is hence communicated with the chamber 10 through the truncated conical passage 105 and the inner annular passage 106 with their passage cross-sectional areas thus reduced. A large resisting force is thus generated for the high-speed rotation of the partitioning member 11 in the R1 direction by causing the flow of the viscous fluid 3 from the chamber 9 into the chamber 10 with large resistance owing to the above-described communication. Furthermore, in the rotation in the R1 direction of the partitioning member 11 due to the input of relative rotation at an even higher speed in the R1 direction from the rotating shaft 58, the annular elastic member 86 in its cross section diameter is even more greatly crush-pressed and deformed elastically by the elastic crush-pressing of the annular elastic member 86 by the plate-like portion 91 of the variable passage forming member 85. Hence, the truncated conical surface 101 is brought into contact with the truncated conical surface 69, thereby closing the truncated conical passage 105. At the same time, the passage cross-sectional area of the inner annular passage 106 is set to a minimal value, thereby substantially minimizing the flow of the viscous fluid 3 in the chamber 9 into the chamber 10 and substantially stopping the above-described high-speed rotation through the partitioning member 11. Hence, the rotation of the impact-absorbed body which tends to rotate the rotating shaft 58 at high speed is stopped, thereby making it possible to positively hold the impact-absorbed body.

When the input of relative rotation in the R2 direction from the rotating shaft 58 ceases, in the flow limiting means 14, the partitioning member 11 begins to be conversely rotated relatively in the R2 direction by the resiliency of the spiral spring 111. In this rotation, the variable passage forming member 85 is relatively moved in the moving-away direction with respect to the partitioning member 11, as shown in FIG. 10. As a result, the outer annular passage 107 is reopened to recover the communication between the chamber 9 and the communicating hole 13 through the outer annular passage 107, and the truncated conical passage 105 and the inner annular passage 106 each having a large passage cross section are formed, thereby causing the flow of the viscous fluid 3 from the chamber 9 into the chamber 10 with small resistance. Hence, the partitioning member 11 is speedily rotated in the R2 direction with such a small resisting force, and the partitioning member 11 is returned to its initial position in which the side face 73 is brought into contact with the hampering wall 5.

The annular elastic member 86, which is made of natural rubber or synthetic rubber having a small modulus of elasticity at high temperature and a large modulus of elasticity at low temperature, undergoes large elastic deformation at high temperature and small elastic deformation at low temperature in the crush-pressing by the plate-like portion 91. Therefore, coupled with the synergistic action with the viscous fluid 3 having a positive temperature characteristic concerning fluidity whereby the fluidity increases at high temperature and decreases at low temperature, it is possible to reduce the temperature dependence of the flow resistance of the viscous fluid 3 flowing through the variable passage 12 having a passage cross-sectional area determined by the elastic deformation of the annular elastic member 86. Thus, it is possible to reduce the difference, for instance, between, on the one hand, the stiffness of the damper 1 in the R1 direction in the case of an input of high-speed rotation exceeding a fixed value in which case the impact becomes large at high temperature and, on the other hand, the stiffness of the damper 1 in the R1 direction in the case of an input of high-speed rotation exceeding the fixed value in which case the impact becomes large at low temperature. Hence, it becomes possible to positively hold the impact-absorbed body with stiffness which does not differ so much both at high temperature and at low temperature with respect to the R1 direction.

Figure 11:
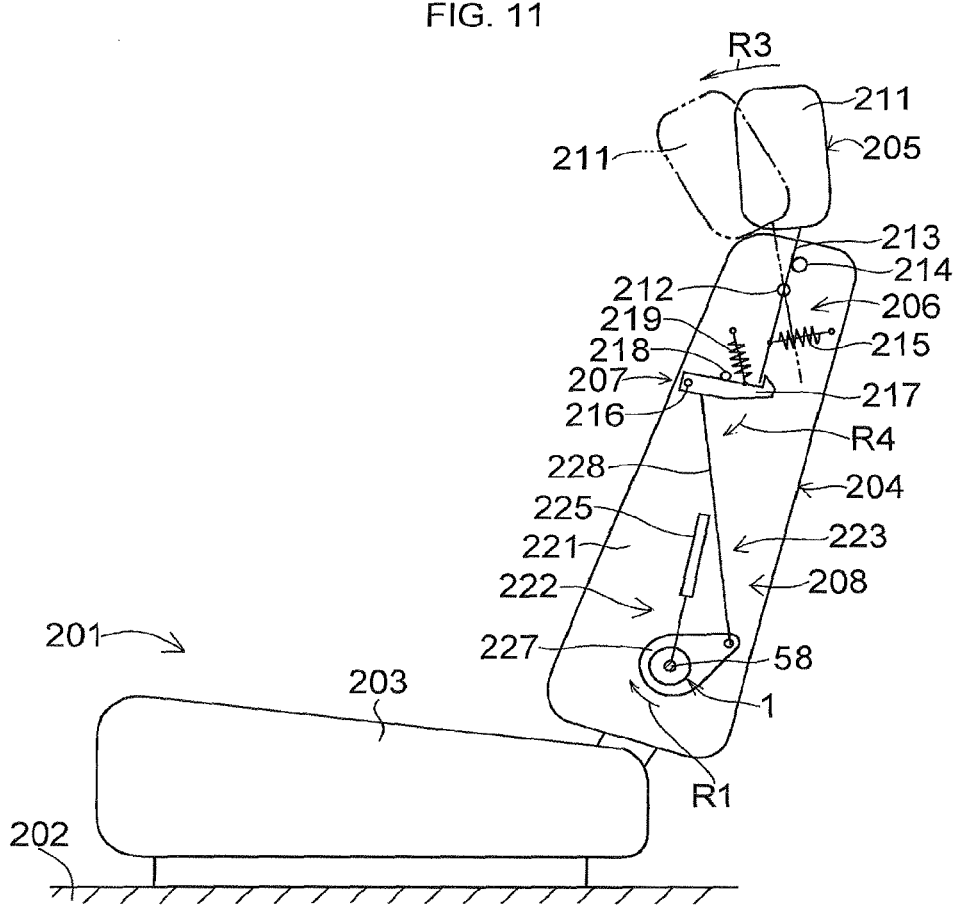
FIG. 11 is an explanatory side elevational view of an embodiment in which the embodiment shown in FIG. 1 is used in a vehicle seat.
Figure 12:
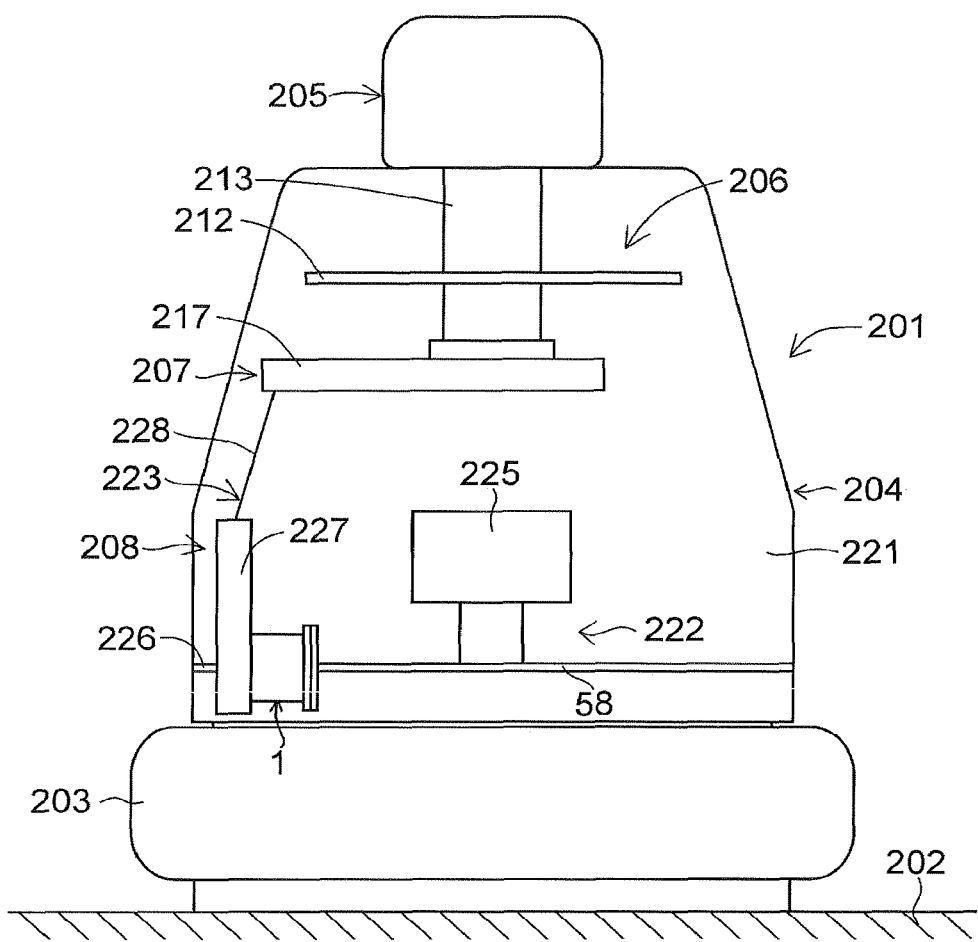
FIG. 12 is an explanatory front elevational view of the embodiment shown in FIG. 11.

The above-described damper 1, which is adapted to brake the relative rotation in the direction R about the axis O of the partitioning member 11 with respect to the vessel 4, may be used for a vehicle seat 201, as shown in FIGS. 11 and 12. Namely, the vehicle seat 201 in accordance with this embodiment is comprised of a seat 203 mounted on a floor 202 of a vehicle such that its front-back position and inclined position are adjustable; a vehicle backrest 204 installed to the seat 203 such that its inclined position is adjustable; a headrest 205 supported by the backrest 204 movably in the forward direction, i.e., rotatably in a forward R3 direction in this embodiment; a rotatively urging means 206 for rotatively urging the headrest 205 in the forward R3 direction; an inhibition mechanism 207 for inhibiting the rotation of the headrest 205 in the R3 direction; and a canceling means 208 for canceling the inhibition by the inhibition mechanism 207 of the movement of the headrest 205 in the R3 direction when the moving velocity of the force applied to the backrest 204 in the backward direction of the vehicle has exceeded a fixed value.

Since the mechanism of mounting the seat 203 on the floor 202 such that its front-back position and inclined position are adjustable and the mechanism of installing the backrest 204 to the seat 203 such that its inclined position is adjustable are publicly known, a detailed description thereof will be omitted.

The headrest 205 has a headrest body 211 and a supporting member 213 which is secured to the headrest body 211 and is supported by a frame (not shown) of the backrest 204 rotatably in the R3 direction by means of a shaft 212. The supporting member 213 is adapted to not rotate in an opposite direction to the R3 direction by a stopper 214 secured to the frame of the backrest 204.

The rotatively urging means 206 serving as a movement urging means has a coil spring 215 having one end secured to the frame of the backrest 204 and the other end secured to the supporting member 213, so as to constantly urge the headrest 205 rotatively in the R3 direction by the resiliency of the coil spring 215.

The inhibition mechanism 207 has a hook member 217 which is supported by a frame of the backrest 204 by means of a shaft 216 rotatably in an R4 direction and abuts against and engages a leading end of the supporting member 213 so as to inhibit the rotation of the supporting member 213 in the R3 direction, as well as a stopper 218 and a coil spring 219 for setting the hook member 217 to an abutting and engaging position with respect to the leading end of the supporting member 213.

The canceling means 208 has a load-rotation converting mechanism 222 which is displaced by the load applied to a back receiving portion 221 of the backrest 204 from an occupant seated in the seat 203 and a transmitting mechanism 223 which transmits to the inhibition mechanism 207 a force applied to the back receiving portion 221 of the backrest 204 in the backward direction of the vehicle on the basis of its velocity exceeding a fixed value, but which does not transmit to the inhibition mechanism 207 the force applied to the back receiving portion 221 of the backrest 204 on the basis of its velocity of the fixed value or less.

The load-rotation converting mechanism 222 has the rotating shaft 58 supported rotatably by the frame of the backrest 204 and a load receiving plate 225 secured to the rotating shaft 58 and disposed in the back receiving portion 221 of the backrest 204. The load receiving plate 225 supported rotatably by the frame of the backrest 204 by means of the rotating shaft 58 is embedded in a cushion in the back receiving portion 221 of the backrest 204.

The transmitting mechanism 223 has a supporting shaft 226 supported by the frame of the backrest 204, an arm member 227 supported by the supporting shaft 226 rotatably in the R1 and R2 directions, the damper 1 secured to the arm member 227, and a wire 228 having one end coupled to the arm member 227 and the other end coupled to the hook member 217. As for the arm member 227, an unillustrated projection formed integrally on that arm member 227 is secured to the damper 1 by being fitted in the bottomed hole 33 of the damper 1. Thus, the arm member 227, i.e., the vessel 4 of the damper 1, is supported by the frame of the backrest 204 rotatably about the supporting shaft 226 in the R1 and R2 directions by means of the arm member 227. Meanwhile, the vessel 4 of the damper 1 is semi-fixed by the resiliency of the coil spring 219 by means of the wire 228 and the hook member 217 with respect to the rotation in the R1 direction.

In the above-described vehicle seat 201, in a case where the occupant is seated in the seat 203 and the occupant's normal load is applied to the backrest 204 in the backward direction of the vehicle, or in a case where the occupant's load is added to the backrest 204 in the backward direction of the vehicle due to the normal acceleration of the vehicle for the occupant seated in the seat 203, these loads upon the backrest 204 are applied slowly at a velocity of a fixed value or less. As a result, the load receiving plate 225 which receives such a load of the occupant is rotated slowly about the rotating shaft 58 in the R1 direction without causing the vessel 4, which is semi-fixed with respect to its rotation in the R1 direction by the resiliency of the coil spring 219, to produce rotation in the R1 direction. This slow rotation of the load receiving plate 225 produces slow flow of the viscous fluid 3 from the chamber 9 into the chamber 10 through the truncated conical passage 105 and the inner annular passage 106 each having a passage cross section determined by the cross section diameter of the annular elastic member 86 which is not greatly deformed elastically, and through the annular gap between the columnar projection 71 and the plate-like portion 91 in the through hole 82, the through holes 72, and the circular hole 74. In consequence, the load receiving plate 225 and, hence, the backrest 204 are subjected to a moderate impact. Meanwhile, in such slow rotation of the load receiving plate 225, the partitioning member 11 is idled in the R1 direction with respect to the vessel 4, as shown in FIG. 8, so that the partitioning member 11 and the vessel 4 are set in an non-coupled state with respect to the rotation in the R1 direction. As a result, a tensile force which produces the rotation in the R4 direction of the hook member 217 such as to cancel the abutment and engagement with the leading end of the supporting member 213 is not produced in the wire 228 through the vessel 4. Thus, the inhibition mechanism 207 inhibits the rotation of the headrest 205 in the forward R3 direction, thereby maintaining the headrest 205 in its normal position.

On the other hand, with the vehicle seat 201, when, upon a collision from the rear, a large velocity in the backward direction exceeding a fixed value has occurred in the occupant seated in the seat 203, and the load receiving plate 225 is suddenly rotated about the rotating shaft 58 in the R1 direction, this rotation of the rotating shaft 58 in the R1 direction at the velocity exceeding the fixed value limits the flow of the viscous fluid 3 from the chamber 9 into the chamber 10 by the truncated conical passage 105 and the inner annular passage 106 each having a passage cross section determined by the cross section diameter of the annular elastic member 86 which has been greatly deformed elastically. As a result, the vessel 4 and the partitioning member 11 are set in a coupled state with respect to the rotation in the R1 direction. In consequence, such rotation of the rotating shaft 58 in the R1 direction at a velocity exceeding the fixed value causes the vessel 4 to undergo rotation about the supporting shaft 226 in the R1 direction through the partitioning member 11 against the resiliency of the coil spring 219. Thus, a tensile force producing the rotation of the hook member 217 in the R4 direction so as to cancel the abutment and engagement with the leading end of the supporting member 213 is produced in the wire 228. Hence, the hook member 217 of the inhibition mechanism 207 is rotated about the shaft 216 in the R4 direction so as to cancel the abutment and engagement with the leading end of the supporting member 213, with the result that the headrest 205 is rotated in the R3 direction by being urged by the coil spring 215 so as to hold the occupant's head.

Thus, the vehicle seat 201 has the transmitting mechanism 223 equipped with the damper 1 serving as a switching mechanism whereby the force applied to the backrest 204 in the backward direction of the vehicle at a velocity exceeding a fixed value is transmitted to the inhibition mechanism 207 so as to cancel the inhibition by the inhibition mechanism 207 of the rotation of the headrest 205 in the forward R3 direction, whereas the force applied to the backrest 204 at a velocity of the fixed value or less is not transmitted to the inhibition mechanism 207 so as to maintain the inhibition by the inhibition mechanism 207 of the rotation of the headrest 205 in the forward R3 direction. Therefore, it is possible to positively move the headrest 205 in the forward R3 direction only at the time of such as a collision by properly discriminating the time of such as a collision and the time of a non-collision.

In the example of the above-described vehicle seat 201, the resetting of the abutment and engagement of the leading end of the supporting member 213 with respect to the hook member 217 can be effected if, after the movement of the headrest 205 in the forward R3 direction, the headrest 205 is forcibly rotated in the opposite direction to the R3 direction to allow the leading end of the supporting member 213 to slide on an inclined surface of the hook member 217 and to reversely rotate the hook member 217. It should be noted that although the wire 228 is used in the above-described embodiment, it is possible to alternatively use a gear mechanism, a rack and pinion mechanism, or the like.

Figure 13:
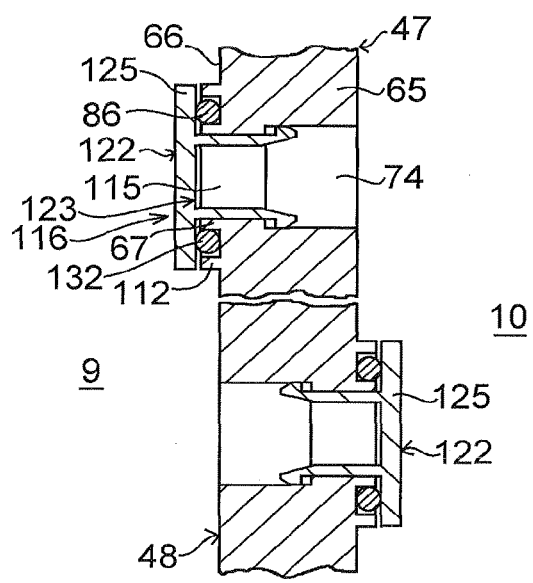
FIG. 13 is an explanatory partial diagram of another preferred embodiment of the invention.
Figure 14:
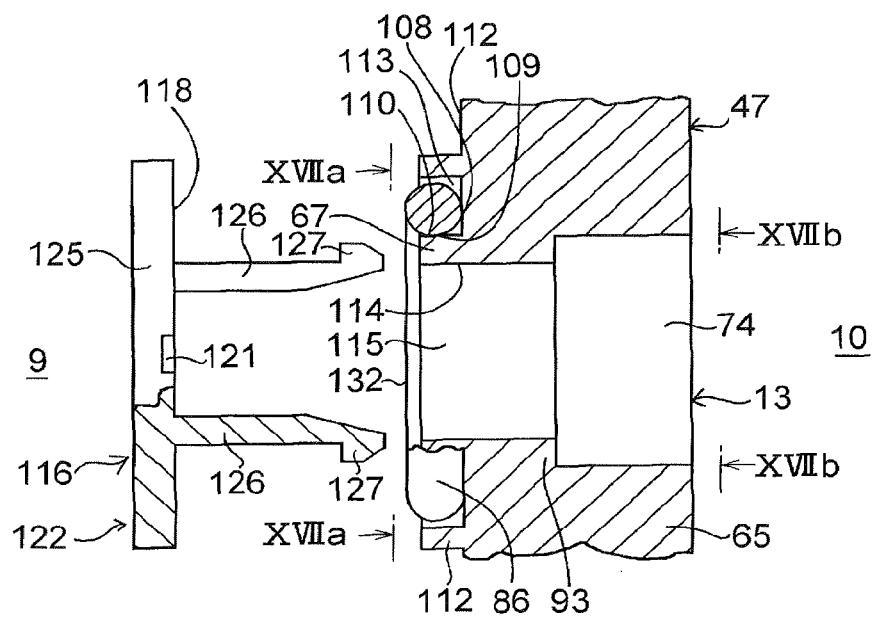
FIG. 14 is an explanatory exploded view of a portion shown in FIG. 13.
Figure 15:
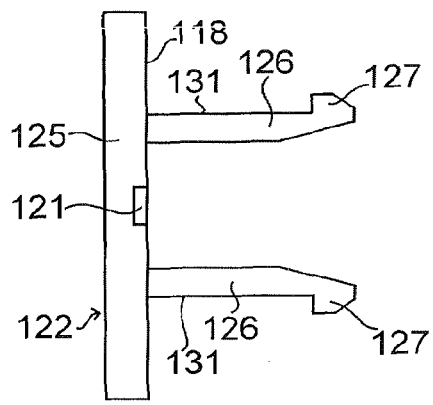
FIG. 15 is an explanatory enlarged view of the variable passage forming member shown in FIG. 13.
Figure 16:
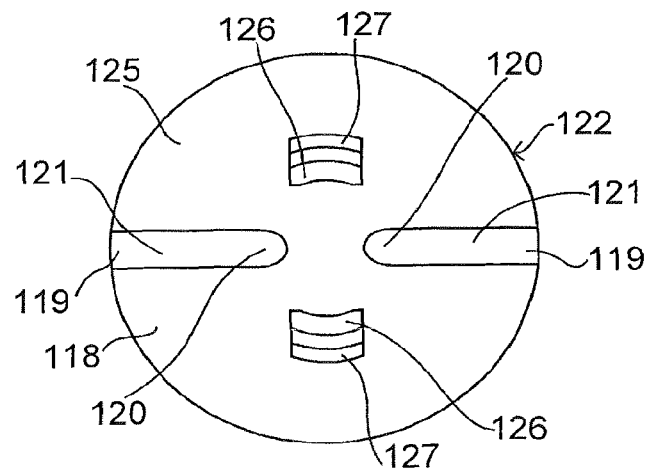
FIG. 16 is a right side elevational view of the variable passage forming member shown in FIG. 15.
Figure 17:
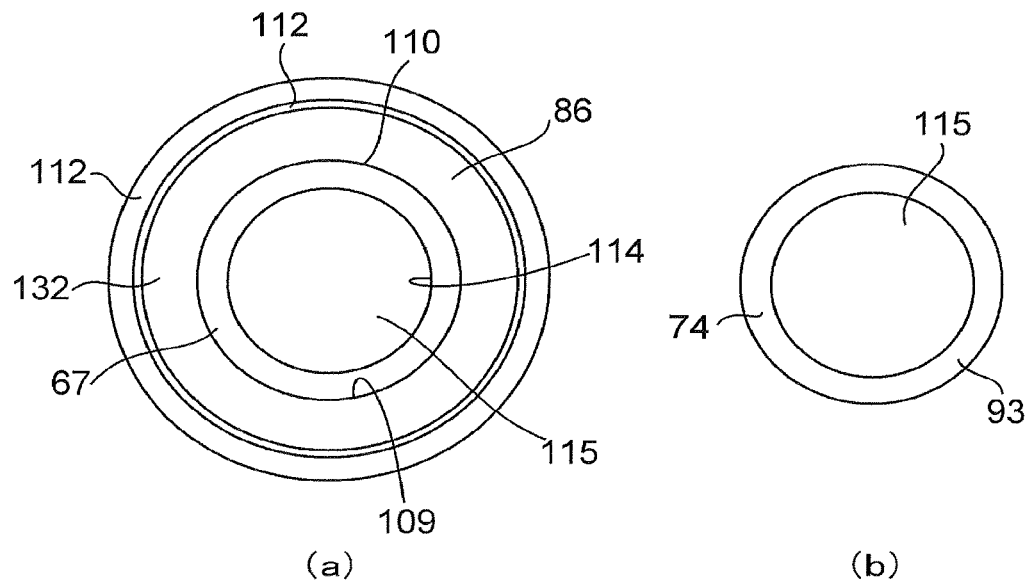
FIG. 17(a) is an explanatory view taken in the direction of arrows along line XVIIa-XVIIa shown in FIG. 14.
FIG. 17(b) is an explanatory view taken in the direction of arrows along line XVIIb-XVIIb shown in FIG. 14, both in the embodiment shown in FIG. 14.

In substitution of the above, an arrangement may be provided as shown in FIGS. 13 and 14. Namely, an annular projection 112 is formed integrally on the side face 66 of the plate-like body 65 in such a manner as to surround the disk-shaped portion 67 and concentrically with the disk-shaped portion 67. The annular elastic member 86 is brought at its side face 108 into contact with the side face 66, is elastically fitted at its inner peripheral surface 109 to the outer peripheral surface 110 of the disk-shaped portion 67, and is disposed in an annular groove 113 defined by the projection 112 and the disk-shaped portion 67 in such a manner as to partially protrude outside that annular groove 113. Further, one circular hole 115 defined by an annular inner peripheral surface 114 of the disk-shaped portion 67 and the plate-like body 65 and communicating with the circular hole 74 is provided in the plate-like body 65 of the blade portion 47. In this case, the communicating hole 13 of the partitioning member 11 is constituted by the single circular hole 115 and the circular hole 74.

Figure 19:
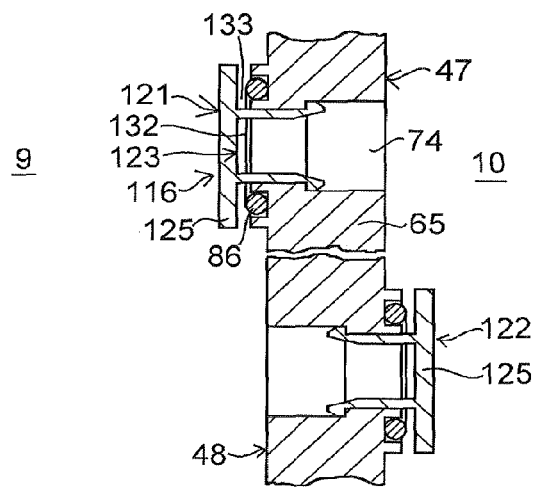
FIG. 19 is a diagram explaining the operation of the embodiment shown in FIG. 18.

Furthermore, a flow limiting means 116 shown in FIGS. 13 to 17 may be used in substitution of the above-described flow limiting means 14. Such a flow limiting means 116 includes a variable passage forming member 122 which is movably fitted to the plate-like body 65 of the partitioning member 11 and has, in its end face 118 in the R2 direction facing the side face 66, a plurality of, i.e., in this embodiment two, radially extending communicating grooves 121 which are respectively open at their one end portions 119 to the chamber 9 and are open at their other end portions 120 to the circular hole 115 of the communicating hole 13; and the annular elastic member 86 which is located between the one end portion 119 and the other end portion 120 of each communicating groove 121 in the radial direction and fitted to the side face 66 of the plate-like body 65 in the blade portion 47 of the partitioning member 11, such that a variable passage 123 (see FIG. 19) including the communicating grooves 121 for effecting mutual communication between the two chambers 9 and 10 in the vessel 2 by means of the communicating hole 13 by allowing the chamber 9 and the communicating hole 13 to communicate is formed by the contact, pressing contact, and non-contact of the annular elastic member 86 with respect to the end face 118 in the R2 direction of the variable passage forming member 122 having the communicating grooves 121.

The variable passage forming member 122 includes a circular plate-like portion 125 having the end face 118 and the communicating grooves 121 formed on the end face 118 symmetrically about the axis; a pair of leg portions 126 which have respective one end portions formed integrally on the plate-like portion 125, project from these one end portions, and are inserted in the circular hole 115 of the communicating hole 13; and hook portions 127 which are respectively formed integrally the other end portions of the pair of leg portions 126 and are engaged with the annular stepped surface 93 between the circular hole 115 and the circular hole 74 so as to prevent the leg portions 126 from coming off the circular hole 115 of the communicating hole 13.

As for the variable passage forming member 122 is fitted to the blade portion 47 of the partitioning member 11 as its pair of leg portions 126 at their outer peripheral surfaces 131 are movably brought into sliding contact with the inner peripheral surface 114 of the plate-like body 65 and the disk-shaped portion 67 defining the circular hole 115.

The variable passage 123 is constituted by an annular passage 133 which is formed between the end face 118 of the plate-like portion 125 of the variable passage forming member 122 and an annular outer peripheral surface 132 of the annular elastic member 86, and whose passage cross-sectional area changes as the end face 118 of the plate-like portion 125 approaches and moves away from that outer peripheral surface 132; and the communicating grooves 121 whose passage cross-sectional area changes as a deforming portion of the annular elastic member 86 is embedded due to the elastic deformation of the annular elastic member 86 by the pressing contact of the outer peripheral surface 132 with the end face 118 of the plate-like portion 125 and as the embedment is canceled on the basis of the cancellation of such pressing contact.

In the slow, low-speed rotation in the R1 direction of the partitioning member 11 in which the internal pressure of the viscous fluid 3 in the chamber 9 is not very large relative to the internal pressure of the viscous fluid 3 in the chamber 10, i.e., in the input of relative low-speed rotation in the R1 direction from the rotating shaft 58, the flow limiting means 116 causes the end face 118 of the variable passage forming member 122 to be brought into contact with the outer peripheral surface 132 of the annular elastic member 86 to such an extent that the annular elastic member 86 is not greatly deformed elastically by the internal pressure of the viscous fluid 3 in the chamber 9, as shown in FIG. 13, to thereby block the annular passage 133 and hamper the communication of the chamber 9 with the chamber 10 through the annular passage 133. Meanwhile, the chamber 9 is communicated with the chamber 10 through the communicating grooves 121 and the communicating hole 13. A small resisting force is thus generated for the slow rotation of the partitioning member 11 in the R1 direction by allowing the flow of the viscous fluid 3 from the chamber 9 into the chamber 10 by the above-described communication.

Figure 18:
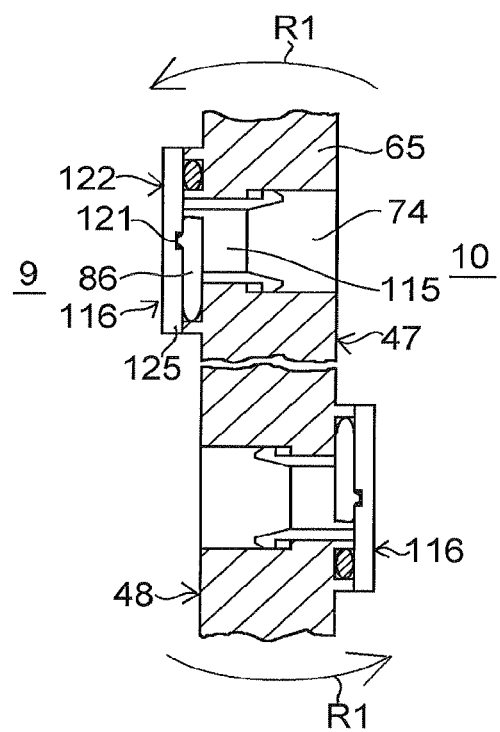
FIG. 18 is a diagram explaining the operation of the embodiment shown in FIG. 18.

In the high-speed rotation in the R1 direction of the partitioning member 11 in which the internal pressure of the viscous fluid 3 in the chamber 9 becomes extremely large relative to the internal pressure of the viscous fluid 3 in the chamber 10, i.e., in the input of relative high-speed rotation in the R1 direction from the rotating shaft 58, the flow limiting means 116 causes the annular elastic member 86 to be greatly deformed elastically in its cross section diameter owing to the pressing contact of the end face 118 of the variable passage forming member 122 with respect to the outer peripheral surface 132 of the annular elastic member 86 by the large internal pressure of the chamber 9, as shown in FIG. 18. As this resilient deformation causes the deforming portion of the annular elastic member 86 to be embedded in the communicating grooves 121, the passage cross-sectional areas of the communicating grooves 121 are narrowed. The chamber 9 is hence communicated with the chamber 10 through the variable passage 123 with its passage cross-sectional area thus narrowed and through the communicating hole 13. A large resisting force is thus generated for the high-speed rotation of the partitioning member 11 in the R1 direction by causing the flow of the viscous fluid 3 from the chamber 9 into the chamber 10 with large resistance owing to the above-described communication. Furthermore, in the rotation in the R1 direction of the partitioning member 11 due to the input of relative rotation at an even higher speed in the R1 direction from the rotating shaft 58, the annular elastic member 86 is even more greatly crush-pressed and deformed elastically by the elastic crush-pressing of the plate-like portion 125 of the variable passage forming member 122 against the outer peripheral surface 132 of the annular elastic member 86. Hence, the passage cross-sectional area of each communicating groove 121 is further narrowed by large embedment of the deforming portion of the annular elastic member 86 into the communicating groove 121, so that the passage cross-sectional area of the variable passage 123 is set to a very small value by the crush-deformed annular elastic member 86, thereby substantially minimizing the flow of the viscous fluid 3 in the chamber 9 into the chamber 10 via the communicating hole 13 and substantially stopping the above-described high-speed rotation through the partitioning member 11. Hence, the rotation of the impact-absorbed body which tends to rotate the rotating shaft 58 at high speed is stopped, thereby making it possible to positively hold the impact-absorbed body.

After the partitioning member 11 has been rotated in the R1 direction, as shown in FIG. 8, when the input of relative rotation in the R2 direction from the rotating shaft 58 ceases, in the flow limiting means 116, the partitioning member 11 begins to be conversely rotated in the R2 direction by the resiliency of the spiral spring 111. In this rotation, the variable passage forming member 122 is relatively moved in the R1 direction with respect to the partitioning member 11. As a result, the embedment of the deforming portion of the annular elastic member 86 with respect to the communicating grooves 121 is canceled, and the annular passage 133 is reopened, thereby causing the flow of the viscous fluid 3 from the chamber 9 into the chamber 10 with small resistance through such communicating grooves 121 and the annular passage 133. Hence, the partitioning member 11 is speedily rotated in the R2 direction with such a small resisting force, and the partitioning member 11 is returned to its initial position.

As described above, when the internal pressure of the viscous fluid 3 accommodated in the chamber 9 is generated in excess of a fixed value on the basis of the rotation of the partitioning member 11 in the R1 direction, the annular elastic member 86 is adapted to be elastically deformed by being brought into pressing contact with the end face 118 of the variable passage forming member 122 after the disappearance of the annular passage 133 on the basis of the relative movement of the variable passage forming member 122, to thereby fill the communicating grooves 121 by its elastically deformed portions and reduce the passage cross-sectional area of the variable passage 123. Meanwhile, when the internal pressure of the viscous fluid 3 accommodated in the chamber 10 is generated in excess of a fixed value on the basis of the rotation of the partitioning member 11 in the R2 direction, the end face 118 of the variable passage forming member 122 is adapted to relatively move away from the annular elastic member 86 so as to form the annular passage 133.

Also in this flow limiting means 116 adapted to brake the relative rotation in the R direction of the partitioning member 11 with respect to the vessel 4, the annular elastic member 86, which is made of natural rubber or synthetic rubber having a small modulus of elasticity at high temperature and a large modulus of elasticity at low temperature, undergoes large elastic deformation at high temperature and small elastic deformation at low temperature in the crush-pressing by the plate-like portion 125. Therefore, coupled with the synergistic action with the viscous fluid 3 having a positive temperature characteristic concerning fluidity whereby the fluidity increases at high temperature and decreases at low temperature, it is possible to reduce the temperature dependence of the flow resistance of the viscous fluid 3 flowing through the variable passage 123 including the communicating grooves 121 whose passage cross-sectional area is determined by the magnitude of the elastic deformation of the annular elastic member 86. Thus, it is possible to reduce the difference, for instance, between, on the one hand, the stiffness of the damper 1 in the R1 direction in the case of an input of high-speed rotation exceeding a fixed value in which case the impact becomes large at high temperature and, on the other hand, the stiffness of the damper 1 in the R1 direction in the case of an input of high-speed rotation exceeding the fixed value in which case the impact becomes large at low temperature. Hence, it becomes possible to positively hold the impact-absorbed body with stiffness which does not differ so much both at high temperature and at low temperature with respect to the R1 direction.

If the damper 1 having the flow limiting means 116 and the like is applied to the above-described vehicle seat 201 shown FIGS. 11 and 12, the damper 1 operates in a similar manner.

The above-described damper 1 having the above-described flow limiting means 14 or the flow limiting means 116 is, in each case, adapted to brake the relative rotation in the R direction of the partitioning member 11 with respect to the vessel 4. Alternatively, however, the damper may be adapted to brake the relative linear movement of the partitioning member with respect to the vessel, as shown in FIGS. 20 and 21.

Figure 20:
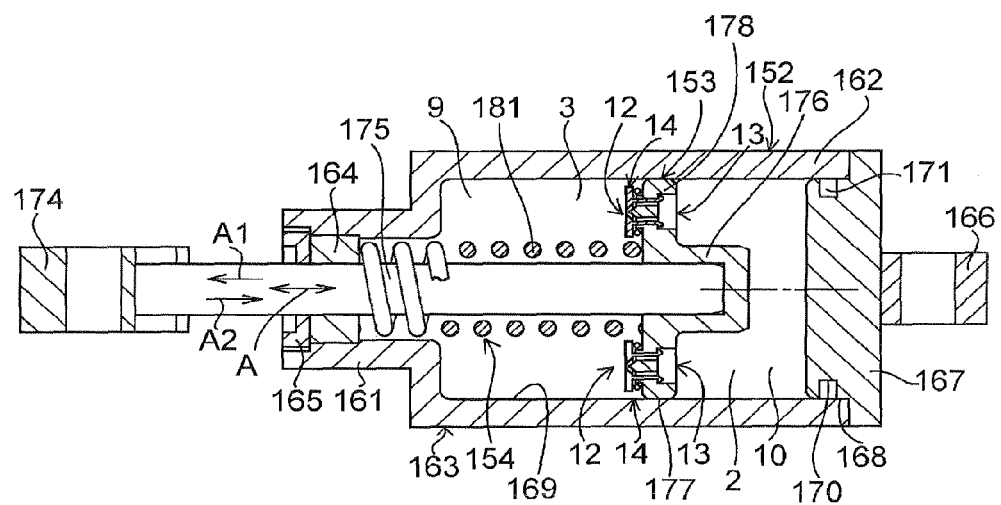
FIG. 20 is an explanatory diagram of still another preferred embodiment of the invention.
Figure 21:
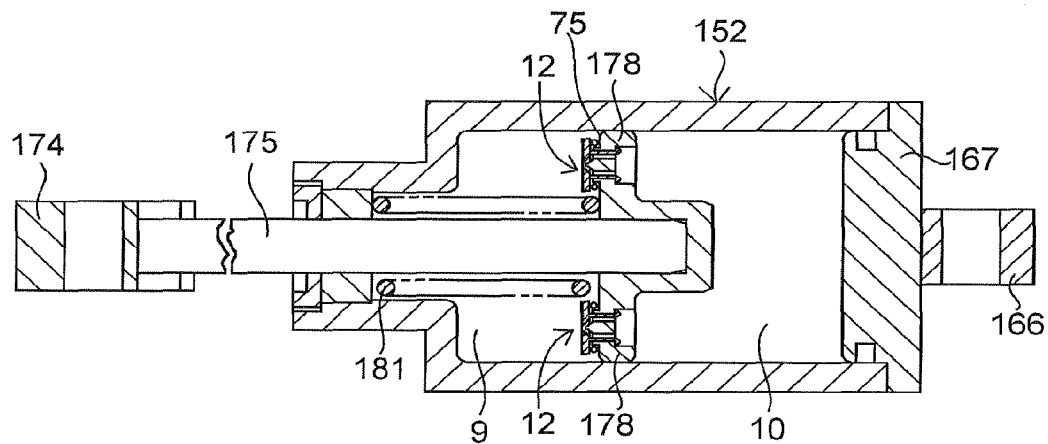
FIG. 21 is a diagram explaining the operation of the embodiment shown in FIG. 20.

Namely, the damper 1 shown in FIGS. 20 and 21 and having the flow limiting means 14, for example, is comprised of a cylinder 152 serving as a vessel for accommodating the viscous fluid 3 in its interior 2; a piston 153 which is provided in the interior 2 of the cylinder 152 linearly movably in the A direction, i.e., the axial direction, and which serves as a partitioning member for partitioning the interior 2 of the cylinder 152 for accommodating the viscous fluid 3 into the two chambers 9 and 10 in the A direction; the communicating hole 13 formed in the piston 153 so as to allow the two chambers 9 and 10 in the interior 2 of the cylinder 152 to communicate with each other through the variable passage 12 whose passage cross-sectional area changes; and a resilient means 154 for resiliently urging the piston 153 in the A2 direction with respect to the cylinder 152. When the internal pressure of the viscous fluid 3 accommodated in the chamber 9 in the A1 direction, which is one direction in the A direction, is generated in excess of a fixed value on the basis of the linear movement of the piston 153 in the A1 direction, the flow limiting means 14 is adapted to limit the flow of the viscous fluid 3 in the chamber 9 into the chamber 10 in the A2 direction, which is the other direction in the A direction, through the communicating hole 13.

The cylinder 152 includes a hollow cylindrical body 163 integrally having a small-diameter hollow cylindrical portion 161 and a large-diameter hollow cylindrical portion 162; an annular bearing member 164 fitted and secured to the inner peripheral surface of an open end portion of the small-diameter hollow cylindrical portion 161; an annular lid member 165 threadedly secured to the inner peripheral surface of the open end portion of the small-diameter hollow cylindrical portion 161 by being located adjacent to the bearing member 164; and an annular closure member 167 fitted and secured to an open end portion of the large-diameter hollow cylindrical portion 162 and having a mounting member 166 formed integrally therewith. A seal ring 171 fitted to an annular groove 170 formed on an annular small-diameter outer peripheral surface 168 of the closure member 167 is disposed between that outer peripheral surface 168 of the closure member 167 and a cylindrical inner peripheral surface 169 of the large-diameter hollow cylindrical portion 162.

The piston 153 includes a bottomed hollow cylindrical base portion 176 which is passed through the bearing member 164 and the lid member 165 linearly movably in the A direction, and to which one end of a rod 175 having a mounting member 174 at its other end disposed outside the cylinder 152 is secured; and an annular portion 178 which is formed integrally on the outer peripheral surface of the base portion 176 and is, at its annular outer peripheral surface 177, in contact with the inner peripheral surface 169 of the large-diameter hollow cylindrical portion 162 linearly movably in the A direction. The annular portion 178 is formed in the same way as the blade portion 47 or 48, and two flow limiting means 14 are provided on such an annular portion 178.

Accordingly, each of the pair of flow limiting means 14 provided in the annular portion 178 includes the variable passage forming member 85 which has the through hole 82 which, in the end face 81 in the A1 direction, is open to the chamber 9 on the A1 direction side, the variable passage forming member 85 being fitted to the annular portion 178 movably in the A direction with respect to the annular portion 178 in such a manner as to oppose at the end face 84 in the A2 direction the side face 75 of the annular portion 178, so as to form the variable passage 12 communicating with, on the one side, the through hole 82 and, on the other side, the communicating hole 13 in cooperation with the side face 75 in the A1 direction of the annular portion 178; and the annular elastic member 86 surrounding the variable passage 12 and disposed between the end face 84 in the A2 direction of the variable passage forming member 85 and the side face 75 in the A1 direction of the annular portion 178.

The resilient means 154 has a coil spring 181 which has one end in the A direction secured and connected to the bearing member 164 and the other end in the A direction secured and connected to the annular portion 178 and surrounds the rod 175. In the same way as the spiral spring 111, the resilient means 154 is adapted to linearly move the piston 153 in the A2 direction by the resiliency of the coil spring 181 so as to return to its original position.

In the damper 1 shown in FIGS. 20 and 21, the above-described flow limiting means 116 may be used in substitution of the flow limiting means 14. The flow limiting means 116 in this case includes the variable passage forming member 122 which is movably fitted to the annular portion 178 and has, in its end face 118 facing the side face 75 of the annular portion 178, the communicating grooves 121 which are respectively open at their one end portions 119 to the chamber 9 and are open at their other end portions 120 to the communicating hole 13; and the annular elastic member 86 which is located between the one end portion 119 and the other end portion 120 of each communicating groove 121 in the radial direction and fitted to the side face 75 in the A1 direction of the annular portion 178, such that the variable passage 123 including the communicating grooves 121 for effecting mutual communication between the two chambers 9 and 10 in the vessel 2 by means of the communicating hole 13 by allowing the chamber 9 and the communicating hole 13 to communicate is formed by the contact, pressing contact, and non-contact of the annular elastic member 86 with respect to the end face 118 in the A2 direction of the variable passage forming member 122 having the communicating grooves 121.

In the damper 1 shown in FIGS. 20 and 21 and having the flow limiting means 116, the variable passage forming member 122 includes the plate-like portion 125 having the communicating grooves 121; the pair of leg portions 126 which have respective one end portions formed integrally on the plate-like portion 125 and are inserted in the communicating hole 13; and the hook portions 127 which are respectively formed integrally on the other end portions of the pair of leg portions 126 and prevent the leg portions 126 from coming off the communicating hole 13. When the internal pressure of the viscous fluid 3 accommodated in the chamber 10 on the A2 direction side is generated in excess of a fixed value on the basis of the linear movement of the annular portion 178 in the A2 direction, the end face 118 in the A2 direction of the variable passage forming member 122 is adapted to move away from the annular elastic member 86. Meanwhile, when the internal pressure of the viscous fluid 3 accommodated in the chamber 9 on the A1 direction side is generated in excess of a fixed value on the basis of the linear movement of the annular portion 178 in the A1 direction, the annular elastic member 86 is adapted to be elastically deformed to thereby fill the communicating grooves 121 and reduce the passage cross-sectional area of the variable passage 12.

Figure 22:
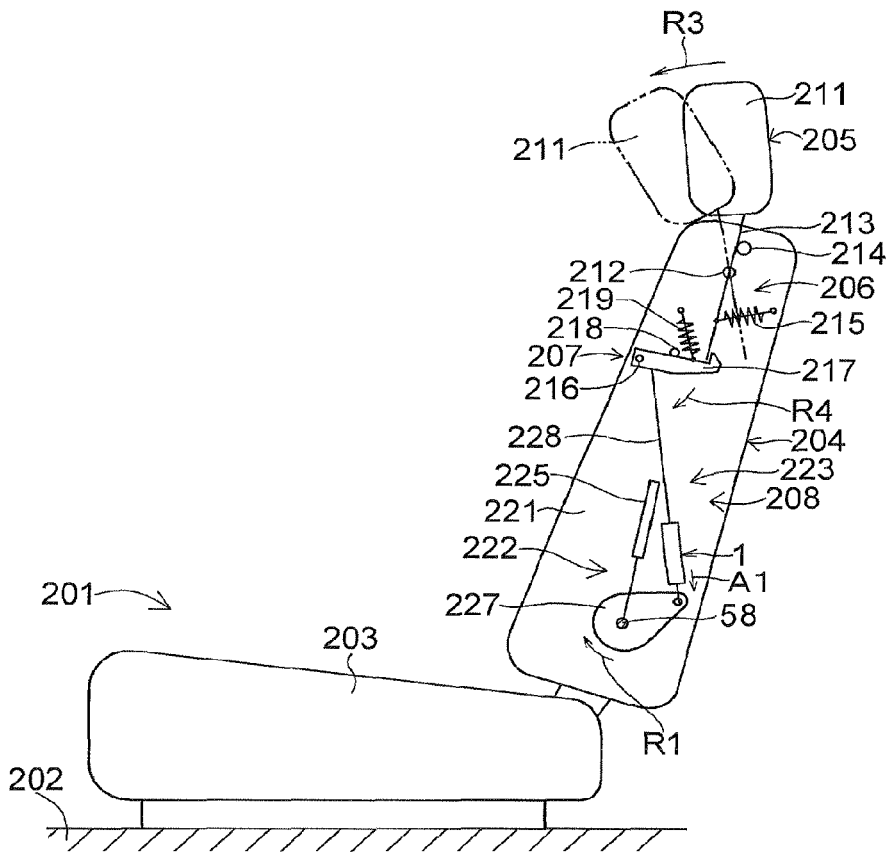
FIG. 22 is an explanatory side elevational view of an embodiment in which the embodiment shown in FIG. 20 is used in a vehicle seat.
Figure 23:
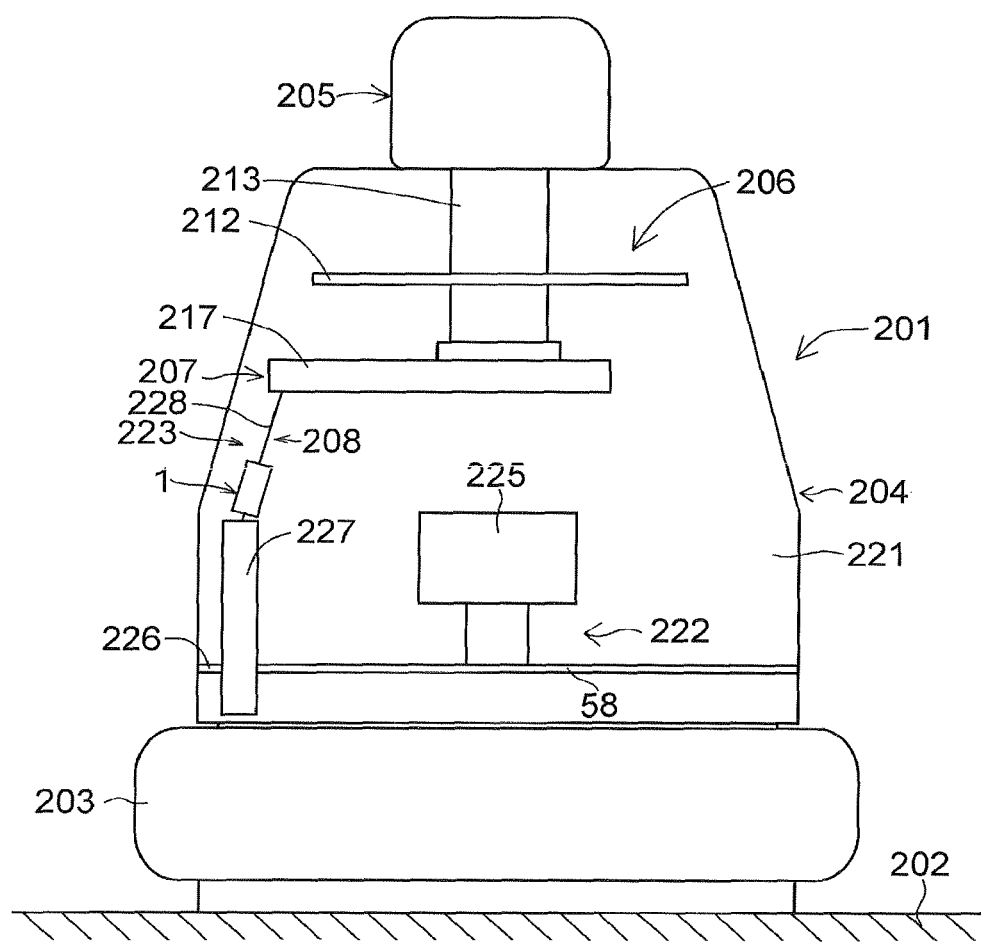
FIG. 23 is an explanatory front elevational view of the embodiment shown in FIG. 22.

The damper 1 shown in FIGS. 20 and 21 can also be used in the vehicle seat 201, as shown in FIGS. 22 and 23. In this case, the damper 1 which is extended and contracted in the A direction by the relative linear movement in the A direction of the cylinder 152 with respect to the piston 153 is used in the vehicle seat 201 by being provided midway in the wire 228 by means of the mounting members 166 and 174. The rotating shaft 58 is secured to the arm member 227 and is directly supported together with the supporting shaft 226 rotatably in the R1 and R2 directions.

The vehicle seat 201 equipped with the damper 1 shown in FIGS. 20 and 21 also has the transmitting mechanism 223 equipped with the damper 1 serving as a switching mechanism whereby the force applied to the backrest 204 in the backward direction of the vehicle at a velocity exceeding a fixed value is transmitted to the inhibition mechanism 207 so as to cancel the inhibition by the inhibition mechanism 207 of the rotation of the headrest 205 in the forward R3 direction, whereas the force applied to the backrest 204 at a velocity of the fixed value or less is not transmitted to the inhibition mechanism 207 so as to maintain the inhibition by the inhibition mechanism 207 of the rotation of the headrest 205 in the forward R3 direction. Therefore, it is possible to positively move the headrest 205 in the forward R3 direction only at the time of such as a collision by properly discriminating the time of such as a collision and the time of a non-collision.

The invention claimed is:

1. A damper comprising:
a vessel for accommodating a viscous fluid in its interior;
at least one hampering wall provided in the interior of said vessel to hamper a flow of the viscous fluid in a rotating direction about an axis of said vessel, said rotating direction having a clockwise rotating direction and a counterclockwise rotating direction opposite to the clockwise rotating direction;
a partitioning member for partitioning the interior of said vessel accommodating the viscous fluid into at least first and second chambers in the rotating direction, said partitioning member being provided in the interior of said vessel rotatably in the rotating direction with respect to said vessel;
at least one communicating hole formed in said partitioning member so as to allow the first and second chambers in the interior of said vessel to communicate with each other via a variable passage whose passage cross-sectional area changes; and
flow limiting means for limiting the flow of the viscous fluid from the first chamber into the second chamber through said communicating hole when an internal pressure of the viscous fluid accommodated in the first chamber has exceeded a fixed value on a basis of a rotation of said partitioning member in the clockwise rotating direction with respect to said vessel,
wherein said flow limiting means includes: a variable passage forming member which is movably fitted to said partitioning member and has, in a first end face of the variable passage forming member in the rotating direction facing a side face in the rotating direction of said partitioning member, a communicating groove which is open at a first end portion of the communicating groove to said first chamber and is open at a second end portion of the communicating groove to said communicating hole; and an annular elastic member which is located between the first end portion and the second end portion of the communicating groove in a radial direction and fitted to the side face in the rotating direction of said partitioning member, such that the variable passage for effecting mutual communication between the first and second chambers in said vessel by means of said communicating hole by allowing said first chamber and said communicating hole to communicate is formed by the annular elastic member and the first end face in the rotating direction of said variable passage forming member having the communicating groove, so as to brake the relative rotation in the rotating direction of said partitioning member with respect to said vessel.

2. The damper according to claim 1, wherein said variable passage forming member has a plate portion having the communicating groove, a leg portion formed, at one end portion of the leg portion, integrally on the plate portion and inserted in said communicating hole, and a hook portion formed integrally on another end portion of the leg portion so as to prevent the leg portion from coming off said communicating hole.

3. The damper according to claim 1, wherein when the internal pressure of the viscous fluid accommodated in said second chamber is generated in excess of a fixed value on the basis of the rotation of said partitioning member in the counterclockwise rotating direction with respect to said vessel, the first end face of said variable passage forming member is adapted to move away from said annular elastic member.

4. The damper according to claim 1, wherein when the internal pressure of the viscous fluid accommodated in said first chamber is generated in excess of a fixed value on the basis of the rotation of said partitioning member in the clockwise rotating direction with respect to said vessel, said annular elastic member is adapted to be elastically deformed to fill the communicating groove and reduce the passage cross-sectional area of the variable passage.

5. The damper according to claim 1, further comprising resilient means for resiliently urging said partitioning member in the counterclockwise rotating direction with respect to said vessel.

6. The damper according to claim 1, wherein said annular elastic member is constituted by an O-ring formed of natural rubber or synthetic rubber whose modulus of elasticity is small at a high temperature and large at a low temperature.

7. A vehicle seat comprising:
a backrest of a vehicle;
a headrest supported by said backrest movably in a forward direction of the vehicle;
  movement urging means for urging said headrest to move in the forward direction;
  an inhibition mechanism for inhibiting the movement of said headrest in the forward direction; and
  canceling means for canceling the inhibition by said inhibition mechanism of the movement of said headrest in the forward direction when a moving velocity of a force applied to said backrest in a backward direction of the vehicle has exceeded a fixed value,
  said canceling means having a load-rotation converting mechanism for converting a load applied to a back receiving portion of said backrest into a rotational force and a transmitting mechanism for transmitting to said inhibition mechanism a force applied to said backrest in the backward direction of the vehicle on the basis of the moving velocity exceeding the fixed value,
  said transmitting mechanism having said damper according to claim 1,
  wherein one of said vessel and said partitioning member of said damper is coupled to said load-rotation converting mechanism, and another one of said vessel and said partitioning member of said damper is coupled to said inhibition mechanism.

8. The vehicle seat according to claim 7, wherein said load-rotation converting mechanism has a load receiving plate supported rotatably by a frame of said backrest and disposed in the back receiving portion of said backrest.

9. The vehicle seat according to claim 7, wherein said headrest is supported by said backrest rotatably or linearly movably in the forward direction, said movement urging means is adapted to urge said headrest to rotate or linearly move in the forward direction, and said inhibition mechanism is adapted to inhibit the rotation or linear movement of said headrest in the forward direction.

10. A damper comprising:
  a vessel for accommodating a viscous fluid in its interior;
  a partitioning member provided in the interior of said vessel linearly movably in an axial direction with respect to said vessel to partition the interior of said vessel for accommodating the viscous fluid into at least first and second chambers in the axial direction, said axial direction having a first direction from the second chamber to the first chamber, and a second direction from the first chamber to the second chamber opposite to the first direction;
  at least one communicating hole formed in said partitioning member so as to allow the first and second chambers in the interior of said vessel to communicate with each other through a variable passage whose passage cross-sectional area changes;
  flow limiting means for limiting the flow of the viscous fluid in the first chamber into the second chamber through said communicating hole when an internal pressure of the viscous fluid accommodated in the first chamber has exceeded a fixed value on the basis of the linear movement of said partitioning member in the first direction with respect to said vessel,
  wherein said flow limiting means includes: a variable passage forming member which has a through hole which, in a first end face in the axial direction of said variable passage forming member, is open to the first chamber, said variable passage forming member being fitted to said partitioning member linearly movably in such a manner as to oppose, at a second end face in axial direction of said variable passage forming member, a side face in the axial direction of said partitioning member, so as to form the variable passage communicating with, on one side, the through hole and, on another side, said communicating hole in cooperation with the side face in the axial direction of said partitioning member; and an annular elastic member surrounding the variable passage and disposed between the second end face in the axial direction of the said variable passage forming member and the side face in the axial direction of said partitioning member, so as to brake the relative linear movement in the axial direction of said partitioning member with respect to said vessel.

11. The damper according to claim 10, wherein said variable passage forming member has a plate portion having the through hole, a leg portion formed, at one end portion of the leg portion, integrally on the plate portion and inserted in said communicating hole, and a hook portion formed integrally on another end portion of the leg portion so as to prevent the leg portion from coming off said communicating hole.

12. The damper according to claim 10, wherein said partitioning member has a truncated conical surface in the side face in the axial direction of said partitioning member, said variable passage forming member has a truncated conical surface which is complementary to the truncated conical surface of said partitioning member and opposes that truncated conical surface, and the variable passage has a truncated conical passage formed by the truncated conical surface of said partitioning member and the truncated conical surface of said variable passage forming member.

13. The damper according to claim 10, further comprising resilient means for resiliently urging said partitioning member in the second direction in the axial direction with respect to said vessel.

14. The damper according to claim 10, wherein said annular elastic member is constituted by an O-ring formed of natural rubber or synthetic rubber whose modulus of elasticity is small at a high temperature and large at a low temperature.

15. A vehicle seat comprising:
a backrest of a vehicle;
a headrest supported by said backrest movably in a forward direction of the vehicle;
  movement urging means for urging said headrest to move in the forward direction;
  an inhibition mechanism for inhibiting the movement of said headrest in the forward direction; and
  canceling means for canceling the inhibition by said inhibition mechanism of the movement of said headrest in the forward direction when a moving velocity of a force applied to said backrest in a backward direction of the vehicle has exceeded a fixed value,
  said canceling means having a load-rotation converting mechanism for converting a load applied to a back receiving portion of said backrest into a rotational force and a transmitting mechanism for transmitting to said inhibition mechanism a force applied to said backrest in the backward direction of the vehicle on the basis of the moving velocity exceeding the fixed value, said transmitting mechanism having said damper according to claim 10, wherein one of said vessel and said partitioning member of said damper is coupled to said load-rotation converting mechanism, and another one of said vessel and said partitioning member of said damper is coupled to said inhibition mechanism.

16. The vehicle seat according to claim 15, wherein said load-rotation converting mechanism has a load receiving plate supported rotatably by a frame of said backrest and disposed in the back receiving portion of said backrest.

17. The vehicle seat according to claim 15, wherein said headrest is supported by said backrest rotatably or linearly movably in the forward direction, said movement urging means is adapted to urge said headrest to rotate or linearly move in the forward direction, and said inhibition mechanism is adapted to inhibit the rotation or linear movement of said headrest in the forward direction.

18. A damper comprising:
a vessel for accommodating a viscous fluid in its interior;
a partitioning member provided in the interior of said vessel linearly movably in an axial direction with respect to said vessel to partition the interior of said vessel for accommodating the viscous fluid into at least first and second chambers in the axial direction, said axial direction having a first direction from the second chamber to the first chamber, and a second direction from the first chamber to the second chamber opposite to the first direction;
at least one communicating hole formed in said partitioning member so as to allow the first and second chambers in the interior of said vessel to communicate with each other through a variable passage whose passage cross-sectional area changes;
flow limiting means for limiting the flow of the viscous fluid in the first chamber into the second chamber through said communicating hole when an internal pressure of the viscous fluid accommodated in the first chamber has exceeded a fixed value on the basis of the linear movement of said partitioning member in the first direction with respect to said vessel,
wherein said flow limiting means includes: a variable passage forming member which is movably fitted to said partitioning member and has, in a first end face of the variable passage forming member in the axial direction facing a side face in the axial direction of said partitioning member, a communicating groove which is open at a first end portion of the communicating groove to said first chamber and is open at a second end portion of the communicating groove to said communicating hole; and an annular elastic member which is located between the first end portion and the second end portion of the communicating groove in a radial direction and fitted to the side face in the axial direction of said partitioning member, such that the variable passage for effecting mutual communication between the first and second chambers in the interior of said vessel by means of said communicating hole by allowing said first chamber and said communicating hole to communicate is formed by the annular elastic member and the first end face in the axial direction of said variable passage forming member having the communication groove, so as to brake the relative linear movement in the axial direction of said partitioning member with respect to said vessel.

19. The damper according to claim 18, wherein said variable passage forming member has a plate portion having the communicating groove, a leg portion formed, at one end portion of the leg portion, integrally on the plate portion and inserted in said communicating hole, and a hook portion formed integrally on another end portion of the leg portion so as to prevent the leg portion from coming off said communicating hole.

20. The damper according to claim 18, wherein when the internal pressure of the viscous fluid accommodated in said second chamber is generated in excess of a fixed value on the basis of the linear movement of said partitioning member in the second direction with respect to said vessel, the first end face in the axial direction of said variable passage forming member is adapted to move away from said annular elastic member.

21. The damper according to claim 18, wherein when the internal pressure of the viscous fluid accommodated in said first chamber is generated in excess of a fixed value on the basis of the linear movement of said partitioning member in the first direction with respect to said vessel, said annular elastic member is adapted to be elastically deformed to fill the communicating groove and reduce the passage cross-sectional area of the variable passage.

22. The damper according to claim 18, further comprising resilient means for resiliently urging said partitioning member in the second direction with respect to said vessel.

23. The damper according to claim 18, wherein said annular elastic member is constituted by an O-ring formed of natural rubber or synthetic rubber whose modulus of elasticity is small at a high temperature and large at a low temperature.

24. A vehicle seat comprising:
a backrest of a vehicle;
a headrest supported by said backrest movably in a forward direction of the vehicle;
movement urging means for urging said headrest to move in the forward direction;
an inhibition mechanism for inhibiting the movement of said headrest in the forward direction; and
canceling means for canceling the inhibition by said inhibition mechanism of the movement of said headrest in the forward direction when a moving velocity of a force applied to said backrest in a backward direction of the vehicle has exceeded a fixed value,
said canceling means having a load-rotation converting mechanism for converting a load applied to a back receiving portion of said backrest into a rotational force and a transmitting mechanism for transmitting to said inhibition mechanism a force applied to said backrest in the backward direction of the vehicle on the basis of the moving velocity exceeding the fixed value,
said transmitting mechanism having said damper according to claim 18,
wherein one of said vessel and said partitioning member of said damper is coupled to said load-rotation converting mechanism, and another one of said vessel and said partitioning member of said damper is coupled to said inhibition mechanism.

25. The vehicle seat according to claim 24, wherein said load-rotation converting mechanism has a load receiving plate supported rotatably by a frame of said backrest and disposed in the back receiving portion of said backrest.

26. The vehicle seat according to claim 24, wherein said headrest is supported by said backrest rotatably or linearly movably in the forward direction, said movement urging means is adapted to urge said headrest to rotate or linearly move in the forward direction, and said inhibition mechanism is adapted to inhibit the rotation or linear movement of said headrest in the forward direction.

* * * * *